US012734522B2

(12) United States Patent
Fan et al.

(10) Patent No.: US 12,734,522 B2
(45) Date of Patent: Sep. 15, 2026

(54) MICROFLUIDIC SUBSTRATE, MICROFLUIDIC CHIP AND MICROFLUIDIC SYSTEM

(71) Applicants: Beijing BOE Sensor Technology Co., Ltd., Beijing (CN); BOE TECHNOLOGY GROUP CO., LTD., Beijing (CN)

(72) Inventors: Bolin Fan, Beijing (CN); Wenliang Yao, Beijing (CN); Yingying Zhao, Beijing (CN); Le Gu, Beijing (CN); Yongjia Gao, Beijing (CN); Qiuxu Wei, Beijing (CN); Li Yang, Beijing (CN)

(73) Assignees: Beijing BOE Sensor Technology Co., Ltd., Beijing (CN); BOE TECHNOLOGY GROUP CO., LTD, Beijing (CN)

( * ) Notice: Subject to any disclaimer, the term of this patent is extended or adjusted under 35 U.S.C. 154(b) by 963 days.

(21) Appl. No.: 17/908,067

(22) PCT Filed: Sep. 2, 2021

(86) PCT No.: PCT/CN2021/116325

§ 371 (c)(1),
(2) Date: Aug. 30, 2022

(87) PCT Pub. No.: WO2023/028968

PCT Pub. Date: Mar. 9, 2023

(65) Prior Publication Data

US 2024/0207852 A1 Jun. 27, 2024

(51) Int. Cl.
*B01L 3/00* (2006.01)

(52) U.S. Cl.
CPC ... *B01L 3/502792* (2013.01); *B01L 3/502715* (2013.01); *B01L 2300/0645* (2013.01);

(Continued)

(58) Field of Classification Search
CPC ......... B01L 3/502792; B01L 3/502715; B01L 2300/0645; B01L 2300/087;

(Continued)

(56) References Cited

U.S. PATENT DOCUMENTS

2010/0183456 A1 7/2010 Toonder et al.
2010/0307922 A1 12/2010 Wu (Continued)

FOREIGN PATENT DOCUMENTS

CN 103386332 A 11/2013
CN 104248997 A 12/2014

(Continued)

OTHER PUBLICATIONS

Chen et al, "Micro-droplet split digital microfluidic device with fan-shaped electrode" (w/ English translation), Optics and Precision Engineering, vol. 27, No. 9, Sep. 2019, 21 pages.

(Continued)

*Primary Examiner* — Christine T Mui
(74) *Attorney, Agent, or Firm* — Dority & Manning, P.A.

(57) ABSTRACT

A microfluidic substrate has a first straight region, a second straight region, and a first turning region, which is substantially of a ring sector and includes a first arc edge and a second arc edge that are opposite. The microfluidic substrate includes first straight driving electrodes in the first straight region, second straight driving electrodes in the second straight region, and turning driving electrodes in the first turning region. A border of each turning driving electrode includes at least one first reference point coinciding with the first arc edge and at least one second reference point coinciding with the second arc edge. A radius of the first arc edge is greater than or equal to ($\sqrt{3}-1$) times of a first dimension of a reference electrode, and a radius of the (Continued)

second arc edge is greater than or equal to 3/2 times of the first dimension of the reference electrode.

20 Claims, 16 Drawing Sheets

(52) U.S. Cl.
CPC ... *B01L 2300/087* (2013.01); *B01L 2300/088* (2013.01); *B01L 2400/0427* (2013.01)

(58) Field of Classification Search
CPC ....... B01L 2300/088; B01L 2400/0427; B01L 2300/161
USPC ........................................... 422/503, 500, 50
See application file for complete search history.

(56) References Cited

U.S. PATENT DOCUMENTS

| | | | | |
|---|---|---|---|---|
| 2016/0175839 | A1* | 6/2016 | Moon | B01L 3/502792 204/600 |
| 2016/0296929 | A1 | 10/2016 | Chen et al. | |
| 2020/0171491 | A1* | 6/2020 | Lv | B01L 3/50273 |
| 2021/0229089 | A1 | 7/2021 | Li | |
| 2022/0226816 | A1 | 7/2022 | Wei et al. | |
| 2022/0341925 | A1 | 10/2022 | Li et al. | |

FOREIGN PATENT DOCUMENTS

| | | | |
|---|---|---|---|
| CN | 108393105 | A | 8/2018 |
| CN | 108772014 | A | 11/2018 |
| CN | 109174219 | A | 1/2019 |
| CN | 109718874 | A | 5/2019 |

OTHER PUBLICATIONS

Li et al, "Using serrated edges to control fluid front motion in microfluidic devices", Microsystem Technologies, No. 23, 2017, pp. 4733-4740.

Extended European Search Report for corresponding EP Application No. 21955506.7, dated Jul. 8, 2024, 9 pages.

Shih-Kang Fan et al., "Droplet-on-a-wristband: Chip-to-chip digital microfluidic interfaces between replaceable and flexible electrowetting modules", Lab Chip, 2011, 11, pp. 343-347.

* cited by examiner

MICROFLUIDIC SUBSTRATE, MICROFLUIDIC CHIP AND MICROFLUIDIC SYSTEM

CROSS-REFERENCE TO RELATED APPLICATION

This application is a national phase entry under 35 USC 371 of International Patent Application No. PCT/CN2021/116325, filed on Sep. 2, 2021, which is incorporated herein by reference in its entirety.

TECHNICAL FIELD

The present disclosure relates to the field of microfluidic technologies, and in particular, to a microfluidic substrate, a microfluidic chip and a microfluidic system.

BACKGROUND

A microfluidic technology (microfluidics) refers to a technology that uses micro-channels (tens to hundreds of micrometres in size) to process or manipulate small amounts of fluids (nanoliters (nL) to microliters (μL) in volume). A microfluidic chip is a main platform for achieving the microfluidic technology. The microfluidic chip has characteristics of parallel collection and processing of samples, high integration, high throughput, high analysis speed, low power consumption, less material consumption, less pollution and the like. The microfluidic technology may be applied to the fields of biological genetic engineering, disease diagnosis and drug research, cell analysis, environmental monitoring and protection, health quarantine, judicial expertise and the like. The microfluidic technology mainly involves mixing and transport of traces of reagent samples, and the sample transport is one of basic steps of biochemical detection.

In recent years, the microfluidic technology has been developed rapidly, and requirements for various performances of the microfluidic chip have also become higher and higher. Reliability and stability of the sample transport is one of key performances to for the microfluidic chip to achieve target biochemical processes, and optimization of this performance is of great significance for the developments of the fields such as biomedicine, pharmacodiagnosis, food hygiene, environmental monitoring and molecular biology.

SUMMARY

In an aspect, a microfluidic substrate is provided. The microfluidic substrate has a first straight region extending in a first direction, a second straight region extending in a second direction and a first turning region. The first direction intersects the second direction. Both ends of the first turning region are respectively connected to the first straight region and the second straight region. The first turning region is substantially a ring sector; the first turning region includes a first arc edge and a second arc edge that are opposite, and the first arc edge is closer to an inner side of the first turning region than the second arc edge.

The microfluidic substrate includes a plurality of first straight driving electrodes, a plurality of second straight driving electrodes and a plurality of turning driving electrodes. The plurality of first straight driving electrodes are arranged in the first direction and are located in the first straight region. The plurality of second straight driving electrodes are arranged in the second direction and are located in the second straight region. The plurality of turning driving electrodes are located in the first turning region. A border of each turning driving electrode includes at least one first reference point coinciding with the first arc edge, and at least one second reference point coinciding with the second arc edge.

A radius of the first arc edge is greater than or equal to ($\sqrt{3}-1$) times of a first dimension of a reference electrode, and a radius of the second arc edge is greater than or equal to 3/2 times of the first dimension of the reference electrode. The reference electrode is one of the plurality of first straight driving electrodes and the plurality of second straight driving electrodes, and the first dimension of the reference electrode is a dimension of an edge, perpendicular to a transport direction, of the reference electrode.

In some embodiments, the turning driving electrode is substantially of a ring sector, an isosceles trapezoid, a triangle or a quasi-triangle. The plurality of turning driving electrodes are arranged sequentially in the transport direction.

In some embodiments, the turning driving electrode is substantially of the ring sector. The turning driving electrode includes a third arc edge and a fourth arc edge that are opposite, and the third arc edge is closer to the inner side of the first turning region than the fourth arc edge. At least one point of the third arc edge is as the at least one first reference point that coincides with the first arc edge, and at least one point of the fourth arc edge is as the at least one second reference point that coincides with the second arc edge.

In some embodiments, the third arc edge coincides with the first arc edge, and/or the fourth arc edge coincides with the second arc edge.

In some embodiments, a length of a side edge, perpendicular to the transport direction, of the turning driving electrode is approximately equal to the first dimension of the reference electrode.

In some embodiments, the turning driving electrode is substantially of the isosceles trapezoid. A midpoint of a short base of the turning driving electrode is as a first reference point that coincides with the first arc edge, and a midpoint of a long base of the turning driving electrode is as a second reference point that coincides with the second arc edge.

In some embodiments, a length of a height of the turning driving electrode is approximately equal to the first dimension of the reference electrode.

In some embodiments, the plurality of turning driving electrodes are approximately same in shape, and approximately equal in area.

In some embodiments, at least one turning driving electrode includes at least two turning sub-electrodes, and sizes of all turning sub-electrodes are approximately equal.

In some embodiments, the first turning region is provided with three turning driving electrodes therein. The radius of the first arc edge of the first turning region is greater than the first dimension of the reference electrode, and the radius of the second arc edge of the first turning region is greater than 2 times of the first dimension of the reference electrode.

In some embodiments, the first turning region is provided with five turning driving electrodes therein. The radius of the second arc edge of the first turning region is greater than or equal to 4 times of the first dimension of the reference electrode.

In some embodiments, the turning driving electrode is substantially of the quasi-triangle, and at least one edge of the quasi-triangle is an arc edge. At least one turning driving electrode has an arc edge coinciding with the first arc edge, and another at least one turning driving electrode has an arc edge coinciding with the second arc edge. An edge, proximate to the first straight driving electrode, of a turning driving electrode adjacent to the first straight driving electrode is a straight edge; and an edge, proximate to a second straight driving electrode, of a turning driving electrode adjacent to the second straight driving electrode is a straight edge. The plurality of turning driving electrodes are spliced into a ring sector in the transport direction.

In some embodiments, the plurality of turning driving electrodes include a first turning electrode, a second turning electrode and a third turning electrode arranged sequentially in the transport direction. A shape of the first turning electrode is same as a shape of the third turning electrode. A vertex of the first turning electrode and a vertex of the third turning electrode are as first reference points that coincide with the first arc edge, and an arc edge of the first turning electrode and an arc edge of the third turning electrode both coincide with the second arc edge. A vertex of the second turning electrode is as a second reference point that coincides with the second arc edge, and an arc edge of the second turning electrode coincides with the first arc edge. Shapes of an edge of the first turning electrode and an edge of the second turning electrode that are proximate to each other match, and shapes of an edge of the third turning electrode and an edge of the second turning electrode that are proximate to each other match.

In some embodiments, the microfluidic substrate further has a third straight region, a fourth straight region, a second turning region, a third turning region and a fourth turning region. The third straight region extends in the first direction, and the third straight region and the first straight region are arranged on both sides of a region surrounded by the first turning region, the second turning region, the third turning region and the fourth turning region in the first direction; the fourth straight region extends in the second direction, and the fourth straight region and the second straight region are arranged on both sides of the region surrounded by the first turning region, the second turning region, the third turning region and the fourth turning region in the second direction. Both ends of the second turning region are respectively connected to the second straight region and the third straight region, both ends of the third turning region are respectively connected to the third straight region and the fourth straight region, and both ends of the fourth turning region are respectively connected to the fourth straight region and the first straight region.

A portion of the first turning region connected to the second straight region coincides with a portion of the second turning region connected to the second straight region; a portion of the second turning region connected to the third straight region coincides with a portion of the third turning region connected to the third straight region; a portion of the third turning region connected to the fourth straight region coincides with a portion of the fourth turning region connected to the fourth straight region; and a portion of the fourth turning region connected to the first straight region coincides with a portion of the first turning region connected to the first straight region.

The microfluidic substrate further includes a plurality of third straight driving electrodes, a plurality of fourth straight driving electrodes, a fourth turning electrode, a fifth turning electrode, a sixth turning electrode, a seventh turning electrode and an eighth turning electrode. The plurality of third straight driving electrodes are arranged in the first direction and are located in the third straight region. The plurality of fourth straight driving electrodes are arranged in the second direction and are located in the fourth straight region. Shapes of the third straight driving electrodes and the fourth straight driving electrodes are both substantially rectangles. The first turning electrode and the fifth turning electrode have a same shape and are symmetrically arranged; the second turning electrode and the sixth turning electrode have a same shape and are symmetrically arranged; the third turning electrode and the seventh turning electrode have a same shape and are symmetrically arranged; and the fourth turning electrode and the eighth turning electrode have a same shape and are symmetrically arranged.

The third turning electrode, the fourth turning electrode and the fifth turning electrode are located in the second turning region; the fifth turning electrode, the sixth turning electrode and the seventh turning electrode are located in the third turning region; and the seventh turning electrode, the eighth turning electrode and the first turning electrode are located in the fourth turning region.

In some embodiments, an included angle between the first direction and the second direction is a right angle.

In some embodiments, an included angle between the first direction and the second direction is an obtuse angle. The plurality of turning driving electrodes include a central electrode, a first sub-electrode, a second sub-electrode, a third sub-electrode and a fourth sub-electrode. The central electrode is in a shape of an isosceles triangle, two legs of the central electrode are respectively perpendicular to the first direction and the second direction. The first sub-electrode is in a shape of a right triangle, a long right-angle edge of the first sub-electrode is adjacent to a first straight driving electrode, and the long right-angle edge of the first sub-electrode is substantially perpendicular to the first direction. The second sub-electrode is in a shape of a right triangle, a long right-angle edge of the second sub-electrode is adjacent to a second straight driving electrode, and the long right-angle edge of the second sub-electrode is substantially perpendicular to the second direction. The third sub-electrode is in a shape of an isosceles triangle, the third sub-electrode is disposed between the first sub-electrode and the central electrode, and two legs of the third sub-electrode are substantially parallel to a hypotenuse of the first sub-electrode and a leg of the central electrode, respectively. The fourth sub-electrode is in a shape of an isosceles triangle, the fourth sub-electrode is disposed between the second sub-electrode and the central electrode, and two legs of the fourth sub-electrode are substantially parallel to a hypotenuse of the second sub-electrode and another leg of the central electrode, respectively.

In some embodiments, the included angle between the first direction and the second direction is approximately 120°, and the central electrode is in a shape of an equilateral triangle.

In some embodiments, lengths of legs of the central electrode are each less than or equal to $\sqrt{2}$ times of the first dimension of the reference electrode. A length of the long right-angle edge of the first sub-electrode and a length of the long right-angle edge of the second sub-electrode are both approximately equal to the first dimension of the reference electrode, and a length of the hypotenuse of the first sub-electrode and a length of the hypotenuse of the second sub-electrode are both approximately equal to the lengths of the legs of the central electrode. A length of a leg of the third sub-electrode and a length of a leg of the fourth sub-electrode are both approximately equal to the lengths of the legs of the central electrode, and a length of a base of the third sub-electrode and a length of a base of the fourth sub-electrode are both approximately equal to a length of a short right-angle edge of the first sub-electrode and a length of a short right-angle edge of the second sub-electrode, respectively.

In some embodiments, lengths of legs of the central electrode is $$\frac{\sqrt{5}}{2}$$

times of the first dimension of the reference electrode, and a length of a short right-angle edge of the first sub-electrode and a length of a short right-angle edge of the second sub-electrode are each ½ times of a second dimension of the reference electrode. The second dimension of the reference electrode is a dimension of an edge, in the transport direction, of the reference electrode.

In some embodiments, a vertex of the first sub-electrode opposite to a short right-angle edge thereof, a midpoint of a base of the third sub-electrode, a vertex of the central electrode opposite to a base thereof, a midpoint of a base of the fourth sub-electrode and a vertex of the second sub-electrode opposite to a short right-angle edge thereof are each as a respective first reference point that coincides with the first arc edge of the first turning region. A midpoint of the short right-angle edge of the first sub-electrode, a vertex of the third sub-electrode opposite to the base thereof, a midpoint of the base of the central electrode, a vertex of the fourth sub-electrode opposite to the base thereof and a midpoint of the short right-angle edge of the second sub-electrode are each as a respective second reference point that coincides with the second arc edge of the first turning region.

In some embodiments, the microfluidic substrate further has a turning extension region and a fifth straight region extending in a third direction; both ends of the turning extension region are respectively connected to the first turning region and the fifth straight region. The microfluidic substrate further includes a plurality of fifth straight driving electrodes, a fifth sub-electrode and a sixth sub-electrode. The plurality of fifth straight driving electrodes are arranged in the third direction and are located in the fifth straight region. The first direction, the second direction and the third direction intersect one another, and the third direction is perpendicular to a base of the central electrode. The fifth sub-electrode is in a shape of a right-angle triangle and located in the turning extension region; a long right-angle edge of the fifth sub-electrode is adjacent to a fifth straight driving electrode, and the long right-angle edge of the fifth sub-electrode is substantially perpendicular to the third direction. The sixth sub-electrode is in a shape of an isosceles triangle and is located in the turning extension region; the sixth sub-electrode is disposed between the fifth sub-electrode and the central electrode, and two legs of the sixth sub-electrode are respectively parallel to a hypotenuse of the fifth sub-electrode and the base of the central electrode.

In some embodiments, a length of the long right-angle edge of the fifth sub-electrode is approximately equal to a length of an edge, adjacent to the long right-angle edge of the fifth sub-electrode, of the fifth straight driving electrode, and a length of the hypotenuse of the fifth sub-electrode is approximately equal to a length of the base of the central electrode. Lengths of the legs of the sixth sub-electrode are approximately equal to the length of the base of the central electrode, and a length of a base of the sixth sub-electrode is approximately equal to a length of a short right-angle edge of the fifth sub-electrode.

In some embodiments, the first straight driving electrodes and the second straight driving electrodes are approximately same in shape, and approximately equal in area.

In some embodiments, shapes of the first straight driving electrodes and the second straight driving electrodes are both substantially rectangles.

In some embodiments, a ratio of a first dimension of a first straight driving electrode to a second dimension of the first straight driving electrode is 1 to 4; and/or a ratio of a first dimension of a second straight driving electrode to a second dimension of the second straight driving electrode is 1 to 4. The first dimension of the first straight driving electrode is a dimension of an edge, perpendicular to the transport direction, of the first straight driving electrode, and the second dimension of the first straight driving electrode is a dimension of an edge, in the transport direction, of the first straight driving electrode. The first dimension of the second straight driving electrode is a dimension of an edge, perpendicular to the transport direction, of the second straight driving electrode, and the second dimension of the second straight driving electrode is a dimension of an edge, in the transport direction, of the second straight driving electrode.

In some embodiments, in the transport direction, a maximum distance between two adjacent first straight driving electrodes is less than or equal to 10 μm, and/or a maximum distance between two adjacent second straight driving electrodes is less than or equal to 10 μm, and/or a maximum distance between two adjacent turning driving electrodes is less than or equal to 10 μm.

In some embodiments, two adjacent side edges, perpendicular to the transport direction, in at least one pair of electrodes are each in a shape of a zigzag and are engaged. The at least one pair of electrodes are from two adjacent first straight driving electrodes, two adjacent second straight driving electrodes, two adjacent turning driving electrodes, a first straight driving electrode and a turning driving electrode that are adjacent to each other, and a second straight driving electrode and a turning driving electrode that are adjacent to each other.

In some embodiments, the reference electrode is a first straight driving electrode adjacent to a turning driving electrode or a second straight driving electrode adjacent to another turning driving electrode.

In some embodiments, in the turning driving electrode and the first straight driving electrode that are adjacent, lengths of two side edges that are proximate to each other are equal; and in the another turning driving electrode and the second straight driving electrode that are adjacent, lengths of two side edges that are proximate to each other are equal.

In some embodiments, the microfluidic substrate further includes a first substrate, and a first conductive layer, an insulating layer, a second conductive layer and a first hydrophobic layer that are disposed on the first substrate sequentially. The first straight driving electrodes, the second straight driving electrodes and the turning driving electrodes are disposed in one of the first conductive layer and the second conductive layer; another of the first conductive layer and the second conductive layer includes a plurality of signal lines, and the plurality of signal lines are electrically connected to the first straight driving electrodes, the second straight driving electrodes and the turning driving electrodes through via holes disposed in the insulating layer.

In another aspect, a microfluidic chip is provided. The microfluidic chip includes the microfluidic substrate as described in any of the above embodiments and a cover plate. The cover plate is opposite to and spaced apart from the microfluidic substrate. The cover plate includes a second substrate, and a common electrode layer and a second hydrophobic layer that are disposed on the second substrate sequentially.

In yet another aspect, a microfluidic system is provided. The microfluidic system includes the microfluidic chip as described in any of the above embodiments.

BRIEF DESCRIPTION OF THE DRAWINGS

In order to describe technical solutions in the present disclosure more clearly, accompanying drawings to be used in some embodiments of the present disclosure will be introduced briefly below. Obviously, the accompanying drawings to be described below are merely accompanying drawings of some embodiments of the present disclosure, and a person of ordinary skill in the art may obtain other drawings according to these drawings. In addition, the accompanying drawings in the following description may be regarded as schematic diagrams, and are not limitations on actual sizes of products, actual processes of methods and actual timings of signals involved in the embodiments of the present disclosure.

DETAILED DESCRIPTION

Figure 1:
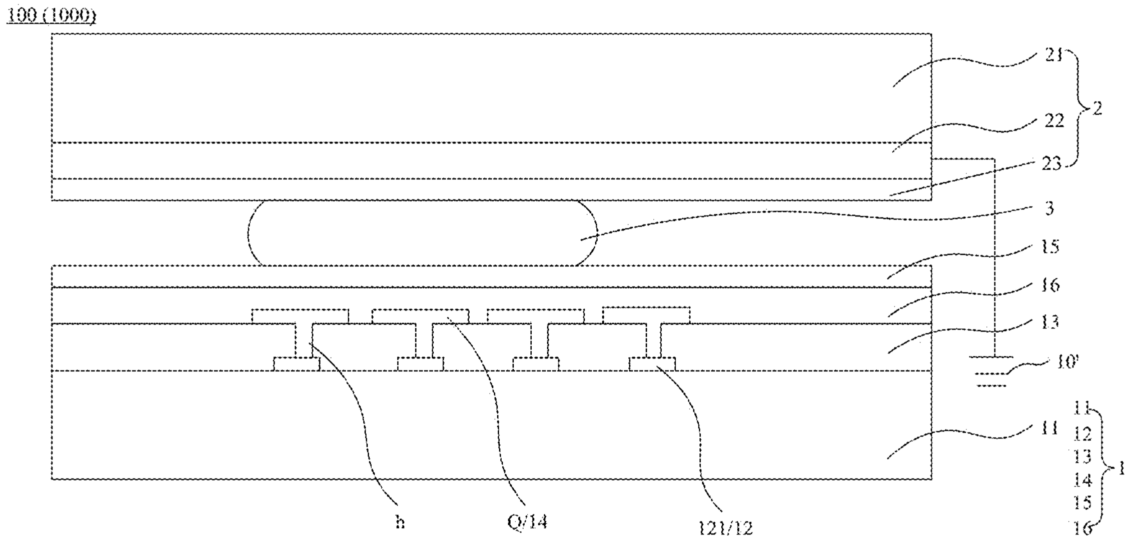
FIG. 1 is a cross-sectional view of a microfluidic chip, in accordance with some embodiments.

Technical solutions in some embodiments of the present disclosure will be described clearly and completely below with reference to the accompanying drawings. Obviously, the described embodiments are merely some but not all embodiments of the present disclosure. All other embodiments obtained by a person of ordinary skill in the art based on the embodiments of the present disclosure shall be included in the protection scope of the present disclosure.

Unless the context requires otherwise, throughout the description and the claims, the term "comprise" and other forms thereof such as the third-person singular form "comprises" and the present participle form "comprising" are construed as an open and inclusive meaning, i.e., "including, but not limited to". In the description of the specification, the terms such as "one embodiment", "some embodiments", "exemplary embodiments", "example", "specific example" or "some examples" are intended to indicate that specific features, structures, materials or characteristics related to the embodiment(s) or example(s) are included in at least one embodiment or example of the present disclosure. Schematic representations of the above terms do not necessarily refer to the same embodiment(s) or example(s). In addition, the specific features, structures, materials or characteristics may be included in any one or more embodiments or examples in any suitable manner.

Hereinafter, the terms such as "first" and "second" are used for descriptive purposes only, and are not to be construed as indicating or implying the relative importance or implicitly indicating the number of indicated technical features. Thus, features defined with "first" or "second" may explicitly or implicitly include one or more of the features. In the description of the embodiments of the present disclosure, the term "a plurality of" or "the plurality of" means two or more unless otherwise specified.

The phrase "at least one of A, B and C" has the same meaning as the phrase "at least one of A, B or C", and they both include the following combinations of A, B and C: only A, only B, only C, a combination of A and B, a combination of A and C, a combination of B and C, and a combination of A, B and C.

The phrase "A and/or B" includes the following three combinations: only A, only B, and a combination of A and B.

As used herein, the term such as "about", "substantially" or "approximately" includes a stated value and an average value within an acceptable range of deviation of a particular value. The acceptable range of deviation is determined by a person of ordinary skill in the art in view of the measurement in question and the error associated with the measurement of a particular quantity (i.e., the limitations of the measurement system).

In the description of the present disclosure, it will be understood that, orientations or positional relationships indicated by the terms such as "center", "lengthwise", "crosswise", "length", "width", "vertical", "horizontal", "inner", "outer" are based on orientations or positional relationships shown in the drawings, which are merely to facilitate and simplify the description of the embodiments of the present disclosure, and are not to indicate or imply that the device or element referred to must have a particular orientation, or must be constructed or operated in a particular orientation. Therefore, they cannot be construed as limitations of the present disclosure.

Exemplary embodiments are described herein with reference to sectional views and/or plan views as idealized exemplary drawings. In the accompanying drawings, thicknesses of layers and sizes of regions are enlarged for clarity. Thus, variations in shape relative to the accompanying drawings due to, for example, manufacturing technologies and/or tolerances may be envisaged. Therefore, the exemplary embodiments should not be construed as being limited to the shapes of the regions shown herein, but including deviations in shape due to, for example, manufacturing. For example, an etched region shown in a rectangular shape generally has a feature of being curved. Therefore, the regions shown in the accompanying drawings are schematic in nature, and their shapes are not intended to show actual shapes of regions in a device, and are not intended to limit the scope of the exemplary embodiments.

Some embodiments of the present disclosure provide a microfluidic system, as shown in FIG. 1, the microfluidic system 1000 integrates complex laboratory functions into a single analytical device or chip by constructing micro-devices, thus achieving miniaturization and integration of an analytical system.

In some embodiments, basic operation units, such as preparation, reaction, separation and detection, of a sample to be tested are integrated into a centimeter-scale chip to manufacture a microfluidic chip. The microfluidic chip is provided with micro-channels therein, and the microfluidic system achieves accurate control and operation of the sample to be tested in the channels by applying driving force to the microfluidic chip.

It will be noted that the sample to be tested may be a liquid substance. For example, the sample to be tested is a blood sample, and molecules to be tested in the blood sample are hemoglobin, platelets, or pathogenic cells. In a microfluidic process, the sample to be tested of the liquid substance is placed in the microfluidic chip in a form of a droplet, and the following embodiments are described by considering an example where the sample to be tested is the droplet.

FIG. 1 shows a cross-sectional structure of the microfluidic chip 100. As shown in FIG. 1, in some embodiments, the microfluidic chip 100 includes a microfluidic substrate 1 and a cover plate 2 that are aligned and combined into a cell. The microfluidic substrate 1 is opposite to and spaced apart from the cover plate 2, and the droplet 3 is placed in a gap between the microfluidic substrate 1 and the cover plate 2. A contact angle of the droplet 3 placed between the microfluidic substrate 1 and the cover plate 2 varies by changing a voltage between the microfluidic substrate 1 and the cover plate 2, so as to make the droplet 3 deformed and displaced, thereby achieving the control over the droplet 3.

The cover plate 2 includes a second substrate 21, and a common electrode layer 22 and a second hydrophobic layer 23 that are disposed on the second substrate 21 sequentially. The second substrate 21 is farther from the microfluidic substrate 1 than the second hydrophobic layer 23.

In some embodiments, the common electrode layer 22 is a continuous transparent conductive layer of indium tin oxide (ITO), which serves as a common electrode of the microfluidic chip 100 and is connected to a grounding electrode 10' (referring to FIG. 2), so as to provide a stable low-level voltage for the microfluidic chip 100.

The microfluidic substrate 1 includes a first substrate 11, and a first conductive layer 12, an insulating layer 13, a second conductive layer 14 and a first hydrophobic layer 15 that are disposed on the first substrate 11 sequentially. The first substrate 11 is farther from the cover plate 2 than the first hydrophobic layer 15. Channel(s) of the droplet 3 are formed between the first hydrophobic layer 15 and the second hydrophobic layer 23, so that the droplet 3 may flow smoothly.

In some embodiments, the second conductive layer 14 is provided with a plurality of driving electrodes Q arranged in an array according to a preset electrode pattern, and the driving electrodes Q are electrically connected to a driving power supply to provide a driving voltage for the microfluidic chip 100.

When a single driving electrode Q is energized, wettability of the droplet 3 varies. As a result, a contact angle of the droplet 3 on a driving electrode Q to which a voltage is applied is different from a contact angle of the droplet 3 on a driving electrode Q to which no voltage is applied, so as to generate a pressure difference inside the droplet 3 and drive the droplet 3 to move in a direction toward the driving electrode Q to which the voltage is applied due to the action of the pressure difference. The droplet 3 may be driven to move in a preset path by applying driving voltages to different driving electrodes Q according to timing, so as to achieve the control over the droplet 3.

The driving electrode Q is generally made of metal or other conductive material. For example, the driving electrode Q may be made of a material such as molybdenum (Mo) or ITO.

In some embodiments, the first conductive layer 12 includes a plurality of signal lines 121 that are made of metal. Optionally, the signal lines 121 are made of Mo. The signal lines 121 are electrically connected to the driving electrodes Q to transmit the driving voltages to the driving electrodes Q.

Figure 2:
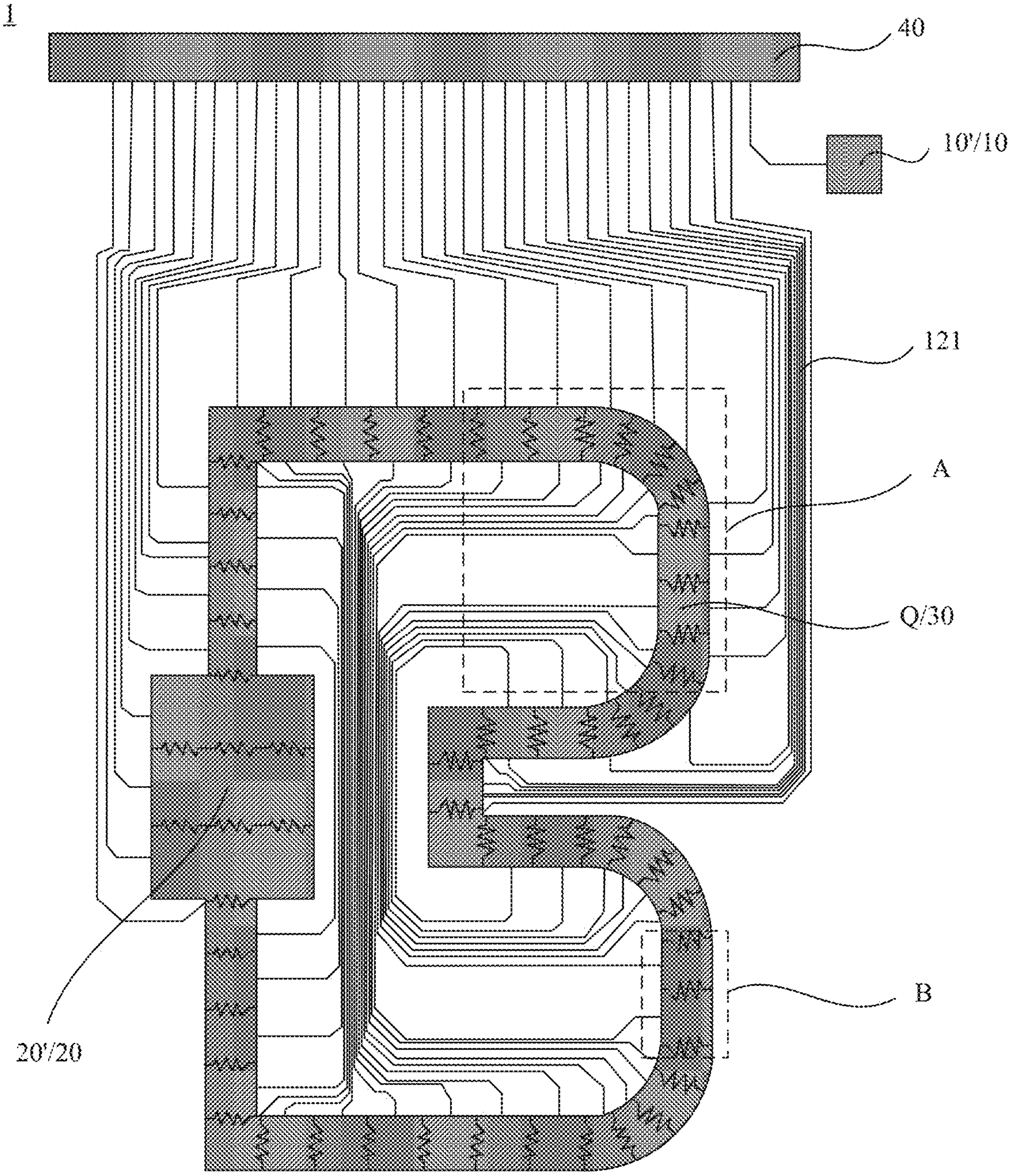
FIG. 2 is a top view of a microfluidic substrate, in accordance with some embodiments.
Figure 15:
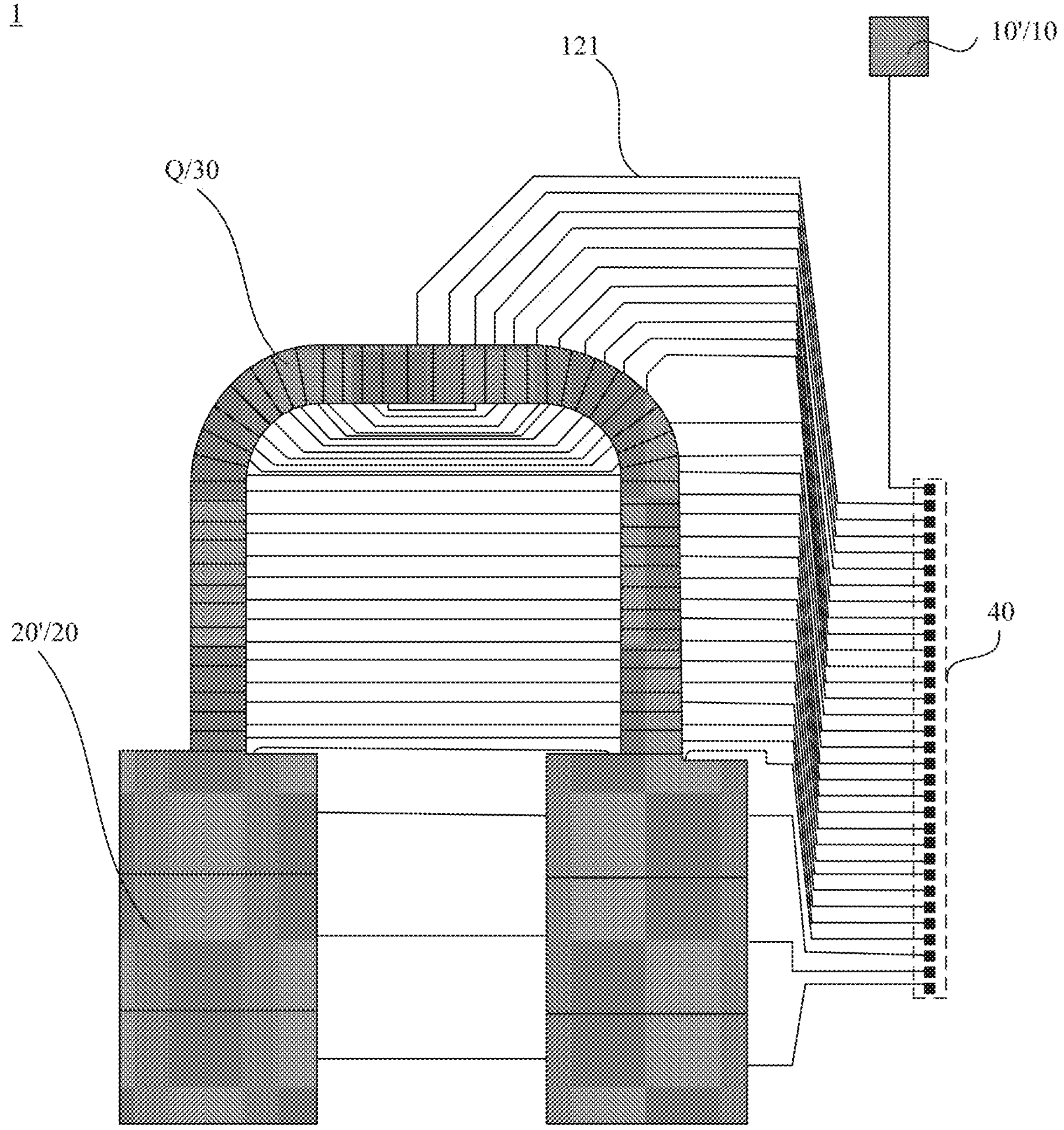
FIG. 15 is a top view of another microfluidic substrate, in accordance with some embodiments.

In some embodiments, the plurality of signal lines 121 are electrically connected to the plurality of driving electrodes Q in one-to-one correspondence, so as to achieve independent control of the plurality of driving electrodes Q. In some embodiments, a single signal line 121 is electrically connected to at least two nonadjacent driving electrodes Q (as shown in FIGS. 2 and 15), thereby reducing the number of pins of the signal lines 121 and saving the wiring space of the signal lines 121 while achieving independent control of adjacent driving electrodes Q.

The insulating layer 13 is disposed between the first conductive layer 12 and the second conductive layer 14, and the insulating layer 13 is provided with via holes h therein. The signal line 121 in the first conductive layer 12 is electrically connected to the driving electrode(s) Q in the second conductive layer 14 through the via hole(s) h. Optionally, the first conductive layer 12 may be located between the second conductive layer 14 and the first substrate 11. Alternatively, the second conductive layer 14 may be located between the first conductive layer 12 and the first substrate 11.

In some embodiments, the microfluidic substrate 1 further includes a dielectric layer 16 disposed between the second conductive layer 14 and the first hydrophobic layer 15, and the dielectric layer 16 is used for promoting accumulation of charges and increasing an electric field intensity to ensure that the microfluidic chip 100 is easy to drive the droplet 3 without causing breakdown. Depending on different materials, the dielectric layer 16 may be formed by various methods such as the vapor deposition (which is applied to parylene, silicon nitride and amorphous fluoropolymers), the thermally grown (which is applied to silicon dioxide), the spin coating (which is applied to polydimethylsiloxane and photoresists). Optionally, the dielectric layer 16 may be a polyimide (PI) film with a dielectric constant of 3.2.

In some embodiments, the first hydrophobic layer 15 and the second hydrophobic layer 23 are both in direct contact with the droplet 3, and the first hydrophobic layer 15 and the second hydrophobic layer 23 are each generally a fluoropolymer (e.g., polytetrafluoroethylene), which is used to reduce an surface energy of the droplet 3 when it is driven.

In some embodiments, the first substrate 11 and the second substrate 21 each may be made of glass with strong chemical inertness, or may be a printed circuit board.

In a process of manufacturing the microfluidic chip 100, the process type and the process accuracy that may realize the microfluidic chip 100 are determined by the electrode pattern formed by the driving electrodes Q in the second conductive layer 14 of the microfluidic substrate 1 and the performance of the microfluidic substrate 1.

FIG. 2 shows a top view of the microfluidic substrate 1. As shown in FIG. 2, in some embodiments, the microfluidic substrate 1 has a storage region 20 and a transport region 30. In some other embodiments, the microfluidic substrate 1 may further have a grounding region 10 and/or a bonding region 40.

The grounding region 10 is provided therein with grounding electrode(s) 10' serving to conduct with the common electrode layer 22 in the cover plate 2, so as to provide the stable low-level voltage for the common electrode. Optionally, a grounding electrode 10' is composed of a square electrode of 1 mm×1 mm, and the size of the grounding electrode(s) 10' and the number of the grounding electrode(s) 10' may be adjusted according to needs.

The storage region 20 is provided therein with storage electrode(s) 20', and the storage electrode 20' has a relatively large area and is used to store the sample to be tested. The voltages of different storage electrodes 20' pull the sample to be tested in the storage region 20 step-by-step to generate the droplet 3, and pull the droplet 3 to the driving electrode Q for operation. Optionally, the storage region 20 is provided therein with three rectangular storage electrodes 20' of 3 mm×1 mm.

The transport region 30 is provided therein with the plurality of driving electrodes Q arranged in the array according to the needed electrode pattern. According to different needed functions of the microfluidic chip 100, the electrode pattern formed by the plurality of driving electrodes Q in the transport region 30 varies, and the number of the driving electrodes Q and the size of the driving electrodes Q also vary.

The plurality of driving electrodes Q are electrically connected to the plurality of signal lines 121. After wiring of the plurality of signal lines 121 is completed, the plurality of signal lines 121 are gathered in the bonding region 40 for bonding. Optionally, a portion of the microfluidic substrate 1 in the bonding region 40 is bonded to the driving power supply. Transmission of the voltage of the driving power supply is controlled, so as to achieve independent control of the driving voltages of the driving electrodes Q.

Passive digital microfluidic chips are the mainstream chip solution in the current commercialized microfluidic chip products due to their great cost advantage. For a high-throughput digital microfluidic chip, reliability and stability of transport of the sample to be tested is one of keys for the chip to realizing a target biochemical process. In particular, in a biological or chemical micro-total analysis system with high integration, high performance and complex operation, the droplet 3 needs to be controlled with relatively high accuracy, and thus requirements for the reliability and the stability of the transport of the droplet 3 are relatively high.

Figure 3:
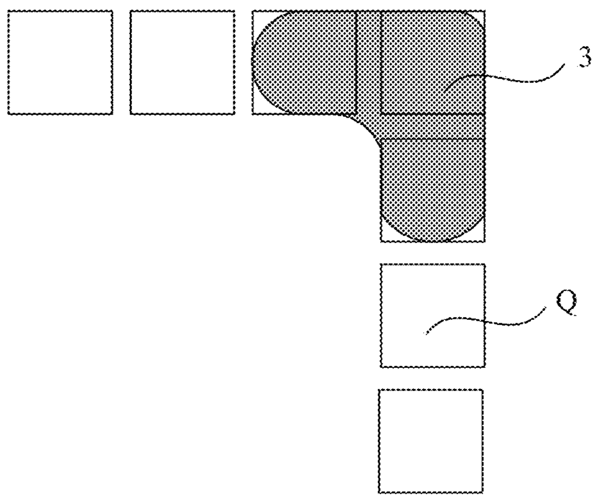
FIG. 3 is a schematic diagram showing a droplet passing through a corner of a channel in the related art.

As shown in FIG. 3, the droplet 3 inevitably needs to transition from a direction to another direction in a transport process thereof, for example, from widthwise transport to lengthwise transport, which involves a turning process of the droplet 3. In a conventional digital microfluidic chip, transport electrodes at a corner commonly use a 90° right-angle turning mode. However, in an actual biochemical reaction process, it is usually necessary to transport a large-volume sample. For example, in a process of library preparation, it is needed to perform mixing and transport of three or more reagents. In this case, the droplet 3 placed in the channel of the microfluidic chip is a large-size sample (the number of occupied driving electrodes Q is greater than or equal to three). When the large-volume sample turns 90°, it is prone to cause a problem of a control failure of the droplet 3, which seriously affects the reliability and the stability of the transport of the droplet 3 of the microfluidic chip, thereby limiting a further development of the digital microfluidic chip.

The droplet 3 has a surface tension in the transport process, so that a certain pressure will be introduced. The pressure P introduced by the surface tension is equal to $\gamma/R$ (i.e., $P=\gamma/R$). Where $\gamma$ is a surface tension coefficient of the droplet 3, and R is a radius of curvature of an arc formed on an inner side of the droplet 3 when the droplet 3 turns. The pressure P increases in a case where the R decreases, and correspondingly, external force needed to maintain a shape of the droplet 3 (e.g., driving force generated in the microfluidic chip due to the electrowetting on dielectric effect) increases. However, after the microfluidic chip system is fixed, the driving force generated due to the electrowetting on dielectric effect is fixed, and thus the radius of curvature of the droplet 3 cannot be reduced indefinitely. That is, the droplet 3 cannot make strict right-angle turnings. Therefore, there must be a case where a portion of the droplet 3 cannot match the driving electrodes Q of the right-angle mode.

As shown in FIG. 3, in a process of the right-angle turning, the large-size droplet 3 occupies three driving electrodes Q. However, due to an influence of the surface tension of liquid, the inner side of the droplet 3 will be changed into an arc at the corner, and a portion of the droplet 3 will be separated from the driving electrodes Q, so as to be unable to match the shape of the driving electrodes Q at the corner. As a result, the droplet 3 is prone to be out of the channel, which affects the stability of the microfluidic chip.

Figure 4:
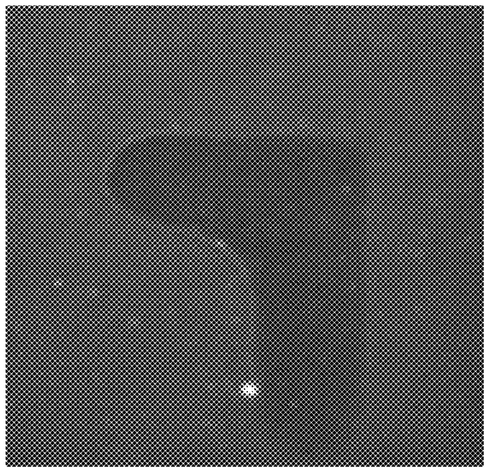
FIG. 4 is a practical test diagram showing a shape of the droplet in FIG. 3.

FIG. 4 shows an actual test phenomenon of a droplet 3 added with surface active agent in a case of FIG. 3. It will be seen from FIG. 4 that the left portion of the droplet 3 has appeared to be out of the control of the driving electrodes Q, and thus there is a risk of the control failure of the droplet 3. For a droplet 3 without added with the surface active agent, the risk of the control failure of the droplet 3 further increases in the turning process of the large-size sample.

In order to solve the above technical problems, the embodiments of the present disclosure provide a new microfluidic substrate 1, which may greatly improve the reliability for the digital microfluidic chip of the transport of the large-volume sample, thereby improving the stability of the digital microfluidic chip, which has great significance for the development of the digital microfluidic chip in the fields such as biomedicine, pharmacodiagnosis, environmental monitoring and biology.

As shown in FIGS. 5 to 14, in some embodiments, the microfluidic substrate 1 has a first straight region X' extending in a first direction X, a second straight region Y' extending in a second direction Y, and a turning region S (also referred to as a first turning region). The first direction X intersects the second direction Y. Both ends of the turning region S are respectively connected to the first straight region X' and the second straight region Y'. The turning region S is substantially of a ring sector, and the turning region S includes a first arc edge S1 and a second arc edge S2 that are opposite, and the first arc edge S1 is closer to an inner side of the turning region S than the second arc edge S2. Optionally, the first arc edge S1 coincides with an arc edge of an arc formed on an inner side of the droplet 3 when the droplet 3 turns, and the second arc edge S2 coincides with an arc edge of an arc formed on an outer side of the droplet 3 when the droplet 3 turns. The shape of the turning region S may be a regular ring sector or an irregular ring sector. For example, a center of a circle of the first arc edge S1 of the turning region S and a center of a circle of the second arc edge S2 of the turning region S may be different.

The microfluidic substrate 1 includes a plurality of first straight driving electrodes Q1, a plurality of second straight driving electrodes Q2 and a plurality of turning driving electrodes Q4. The plurality of first straight driving electrodes Q1, the plurality of second straight driving electrodes Q2 and the plurality of turning driving electrodes Q4 are all the driving electrodes Q mentioned above.

The plurality of first straight driving electrodes Q1 are arranged in the first direction X and located in the first straight region X'. The plurality of second straight driving electrodes Q2 are arranged in the second direction Y and located in the second straight region Y'. The plurality of turning driving electrodes Q4 are located in the turning region S. A border of each turning driving electrode Q4 includes at least one first reference point M coinciding with the first arc edge S1 and at least one second reference point N coinciding with the second arc edge S2. It will be seen that a radius of curvature of the turning driving electrode Q4 at the first reference point M is a radius R1 of the first arc edge S1, and a radius of curvature of the turning driving electrode Q4 at the second reference point N is a radius R2 of the second arc edge S2.

The radius of the first arc edge S1 is greater than or equal to $(\sqrt{3}-1)$ times of a first dimension L1 of a reference electrode Q', and the radius of the second arc edge S2 is greater than or equal to $3/2$ times of the first dimension L1 of the reference electrode Q'. That is, the radius of curvature of the turning driving electrode Q4 at the first reference point M is greater than or equal to $(\sqrt{3}-1)$ times of the first dimension L1 of the reference electrode Q', and the radius of curvature of the turning driving electrode Q4 at the second reference point N is greater than or equal to $3/2$ times of the first dimension L1 of the reference electrode Q'.

The reference electrode Q' mentioned above is one of the plurality of first straight driving electrodes Q1 and the plurality of second straight driving electrodes Q2, the first dimension L1 of the reference electrode Q' is a dimension of an edge, perpendicular to a transport direction TR of a droplet 3, of the reference electrode Q', and a second dimension L2 of the reference electrode Q' is a dimension of an edge, parallel to the transport direction of the droplet 3, of the reference electrode Q'.

Figure 17:
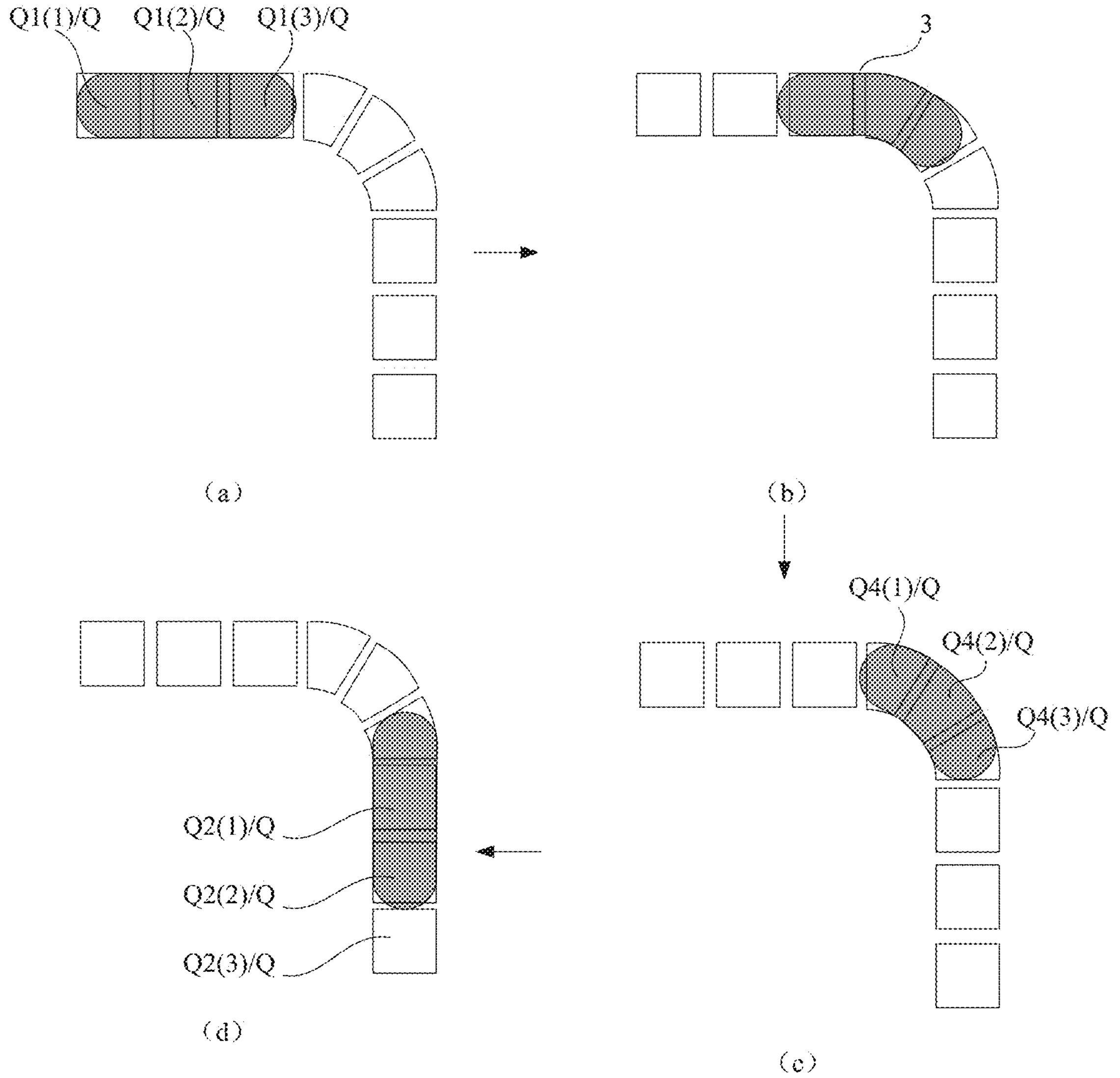
FIG. 17 is a diagram showing a transport process of a droplet, in accordance with some embodiments.

In some embodiments, the transport direction of the droplet 3 in the first straight region X' is the first direction X, the transport direction of the droplet 3 in the second straight region Y' is the second direction Y, and the transport direction of the droplet 3 in the turning region S is an extension direction of an arc edge (the first arc edge S1 or the second arc edge S2) of the turning region S. Optionally, the droplet 3 is transported from the first straight region X' to the turning region S, and finally to the second straight region Y' (e.g., as shown in FIG. 17).

In some embodiments, shapes of the first straight driving electrode Q1 and the second straight driving electrode Q2 are both substantially rectangles.

In some embodiments, the reference electrode Q' is a first straight driving electrode Q1 or a second straight driving electrode Q2, which is proximate to the turning region S.

In some embodiments, the first arc edge S1 and the second arc edge S2 are respectively tangent to two edges, parallel to the transport direction of the droplet 3, of the reference electrode Q' proximate to the turning region S.

In some embodiments, the first arc edge S1 and the second arc edge S2 are respectively tangent to two edges, parallel to the transport direction of the droplet 3, of the reference electrode Q' proximate to the turning region S, and the center of the circle of the first arc edge S1 substantially coincides with the center of the circle of the second arc edge S2. In this case, if a width (perpendicular to the transport direction of the droplet 3) of a channel in the turning region S for the droplet 3 to pass through is approximately equal to the first dimension L1 of the reference electrode Q', a difference between the radius R1 of the first arc edge S1 and the radius R2 of the second arc edge S2 is equal to the first dimension L1 of the reference electrode Q'. For example, the radius R1 of the first arc edge S1 is approximately equal to $(\sqrt{3}-1)$ times of the first dimension L1 of the reference electrode Q', and the radius R2 of the second arc edge S2 is approximately equal to $\sqrt{3}$ times of the first dimension L1 of the reference electrode Q'. Alternatively, the radius R1 of the first arc edge S1 is approximately equal to 1.5 times of the first dimension L1 of the reference electrode Q', and in this embodiment, the radius R2 of the second arc edge S2 is approximately equal to 2.5 times of the first dimension L1 of the reference electrode Q'.

In the transport process, the droplet 3 turning in the turning region S also has the surface tension, and the pressure P induced by the surface tension is equal to $\gamma/R$ (i.e., $P=\gamma/R$). It will be seen that the greater the R, the less the pressure induced by the surface tension, so that the fixed driving force provided by the microfluidic chip 100 is easier to control the droplet 3, and the risk that the droplet 3 is separated from the driving electrodes Q is lower. Therefore, the radii of the first arc edge S1 and the second arc edge S2 of the turning region S may be set relatively large on a premise that the droplet 3 turns smoothly. For example, the radius R1 of the first arc edge S1 may be approximately equal to 2.5 times of the first dimension L1 of the reference electrode Q', and the radius R2 of the second arc edge S2 may be approximately equal to 3 times of the first dimension L1 of the reference electrode Q'.

In optional embodiments, a ratio of the radius R1 of the first arc edge S1 to the first dimension L1 of the reference electrode Q' may be approximately equal to $(\sqrt{3}-1)$, 1, 1.25, 1.5, 2, or 2.5, etc.

For example, in a case where the first direction X and the second direction Y intersect at 90°, the radius R1 of the first arc edge S1 is greater than the first dimension L1 of the reference electrode Q'. For example, the ratio of the radius R1 of the first arc edge S1 to the first dimension L1 of the reference electrode Q' may be approximately equal to 1.25, 1.5, 2, or 2.5, etc.

For example, in a case where the first direction X and the second direction Y intersect at 120°, the radius R1 of the first arc edge S1 is greater than or equal to $(\sqrt{3}-1)$ times of the first dimension L1 of the reference electrode Q'. For example, the ratio of the radius R1 of the first arc edge S1 to the first dimension L1 of the reference electrode Q' may be approximately equal to $(\sqrt{3}-1)$. 1, 1.25, $2(\sqrt{3}-1)$. 2, or 2.5, etc.

In optional embodiments, a ratio of the radius R2 of the second arc edge S2 to the first dimension L1 of the reference electrode Q' may be approximately equal to 1.5, $\sqrt{3}$, 2, 2.25, 2.5, 3, 4, or 4.5, etc. For example, in the case where the first direction X and the second direction Y intersect at 90°, the radius R2 of the second arc edge S2 is greater than 2 times of the first dimension L1 of the reference electrode Q'. For example, the ratio of the radius R2 of the second arc edge S2 to the first dimension L1 of the reference electrode Q' may be approximately equal to 2.25, 2.5, 3, 3.5, 3.75, or 4, etc.

For example, in the case where the first direction X and the second direction Y intersect at 120°, the radius R2 of the second arc edge S2 is greater than or equal to $\sqrt{3}$ times of the first dimension L1 of the reference electrode Q'. For example, the ratio of the radius R2 of the second arc edge S2 to the first dimension L1 of the reference electrode Q' may be approximately equal to $\sqrt{3}$, 2, 2.25, $2\sqrt{3}$, 4, or 4.5, etc.

By controlling a multiple relationship between the radius of curvature of the turning driving electrode Q4 at at least one reference point (including the first reference point M and the second reference point N) and the dimension of the reference electrode Q', the shape of the driving electrode Q at the corner is changed, so as to match a shape of the large-size droplet 3 formed due to an action of the surface tension when it turns and achieve a high-curvature turning of the droplet 3, thereby ensuring smooth transport of the large-size droplet 3 at the corner and improving the stability of the microfluidic chip 100.

In some embodiments, the turning driving electrode Q4 is substantially of a ring sector, an isosceles trapezoid, a triangle or a quasi-triangle. The plurality of turning driving electrodes Q4 are arranged sequentially in the transport direction of the droplet 3. By providing different shapes for the turning driving electrode Q4, the smooth transport and transition of the droplet 3 in the turning region S may be achieved.

It will be noted that at least one edge of the quasi-triangle is of an arc-shape. The quasi-triangle has three edges, a shape formed by connecting the three edges end to end is substantially a triangle, but the three edges are not all straight edges like those of a triangle. At least one edge of the three edges of the quasi-triangle is not a straight edge. For example, at least one edge is of the arc-shape, or at least two edges are of the arc-shape.

In some embodiments, the shape of the turning driving electrode Q4 is substantially the ring sector. The turning driving electrode Q4 includes a third arc edge S3 and a fourth arc edge S4 that are opposite, and the third arc edge S3 is closer to the inner side of the turning region S than the fourth arc edge S4. At least one point of the third arc edge S3 is as the at least one first reference point M that coincides with the first arc edge S1, and at least one point of the fourth arc edge S4 is as the at least one second reference point N that coincides with the second arc edge S2. The shape of the turning driving electrode Q4 is the ring sector, which makes it easy to control a radius of curvature of the border of the turning driving electrode Q4 to match the shape of the droplet 3 when it turns, thereby avoiding the droplet 3 being out of the borders of the driving electrodes Q when the droplet 3 turns, and improving the stability of the microfluidic chip 100.

Figure 5:
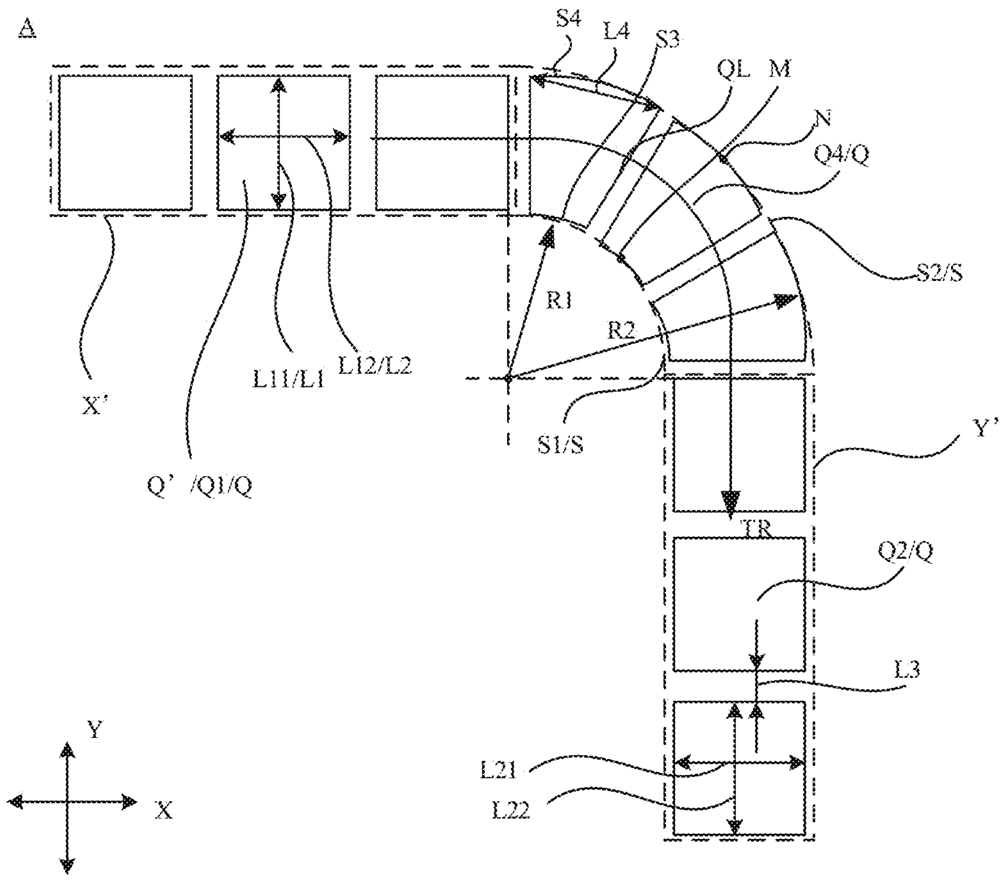
FIG. 5 is a diagram showing a structure corresponding to the region A in FIG. 2.

As shown in FIG. 5, in exemplary embodiments, the first direction X and the second direction Y are perpendicular to each other (i.e., the channel for the droplet 3 has a corner of 90°). The first straight driving electrodes Q1 and the second straight driving electrodes Q2 are approximately the same in shape, and approximately equal in area. The shape of the turning driving electrode Q4 is the regular ring sector. A length of a side edge QL (an edge perpendicular to the transport direction of the droplet 3) of the turning driving electrode Q4 is approximately equal to the first dimension L1 of the reference electrode Q'. A center of a circle of the third arc edge S3 of the turning driving electrode Q4 coincides with a center of a circle of the fourth arc edge S4 of the turning driving electrode Q4, the third arc edge S3 substantially coincides with the first arc edge S1 of the turning region S, and the fourth arc edge S4 substantially coincides with the second arc edge S2 of the turning region S. That is, a radius of the third arc edge S3 is approximately equal to the radius R1 of the first arc edge S1, and a radius of the fourth arc edge S4 is approximately equal to the radius R2 of the second arc edge S2.

The radius of the third arc edge S3 (or the first arc edge S1) is greater than the first dimension L1 of the reference electrode Q', and the radius of the fourth arc edge S4 (or the second arc edge S2) is greater than 2 times of the first dimension L1 of the reference electrode Q'. For example, the radius of the third arc edge S3 is a sum of the first dimension L1 of the reference electrode Q' and a width L3 of a gap between the reference electrode Q' and a straight electrode adjacent thereto, and the radius of the fourth arc edge S4 is a sum of 2 times of the first dimension L1 of the reference electrode Q' and the width L3 of the gap between the reference electrode Q' and a straight electrode adjacent thereto. In the embodiments of the present disclosure, the first arc edge S1 and the second arc edge S2 of the turning region S are respectively tangent to edges of the reference electrode Q' proximate to the turning region S, the shape of the turning driving electrode Q4 matches the shape of the droplet 3 formed due to the electrowetting on dielectric effect when the droplet 3 turns, and in particular, the radius R1 of the first arc edge S1 is approximately equal to the radius of curvature R of the inner side of the droplet 3 when the droplet 3 turns. Therefore, the smooth turning and transport of the droplet 3 in the turning region S may be ensured, and the droplet 3 may be prevented from being out of the driving electrodes Q, so that the stability of the microfluidic chip 100 may be improved. In addition, in the embodiments of the present disclosure, a width (a dimension perpendicular to the transport direction of the droplet 3) of the droplet 3 in the turning process is always approximately equal to the first dimension L1 of the reference electrode Q', and the shape thereof is hardly changed, so that the stability of the transport of the droplet 3 at the corner may be further improved.

In optional embodiments, the center of the circle of the third arc edge S3 of the turning driving electrode Q4 does not coincide with the center of the circle of the fourth arc edge S4 of the turning driving electrode Q4. For example, the radius of the third arc edge S3 (or the first arc edge S1) is greater than the first dimension L1 of the reference electrode Q'. For example, the radius of the third arc edge S3 is equal to the sum of the first dimension L1 of the reference electrode Q' and the width L3 of the gap between the reference electrode Q' and the straight electrode adjacent thereto, so as to ensure that the third arc edge S3 is tangent to the edge of the reference electrode Q', thereby ensuring that the arc formed on the inner side of the droplet 3 in the turning process is smooth. The radius of the fourth arc edge S4 (or the second arc edge S2) may be greater than 1.5 times of the first dimension L1 of the reference electrode Q'. That is, the fourth arc edge S4 may be not tangent to the edge of the reference electrode Q'. In this case, a shape formed on the outer side of the droplet 3 in the turning process of the droplet 3 may be changed according to needs. In the embodiments of the present disclosure, it may be ensured that the radius of curvature R of the arc formed on the inner side of the droplet 3 when the droplet 3 turns matches the edge of the driving electrode Q, and thus the smooth transport of the droplet 3 may be ensured. Moreover, a dimension of an edge of the outer side of the turning driving electrode Q4 may be designed according to needs on a premise of ensuring the smooth transport of the droplet 3, so as to improve flexibility of space utilization.

Figure 6:
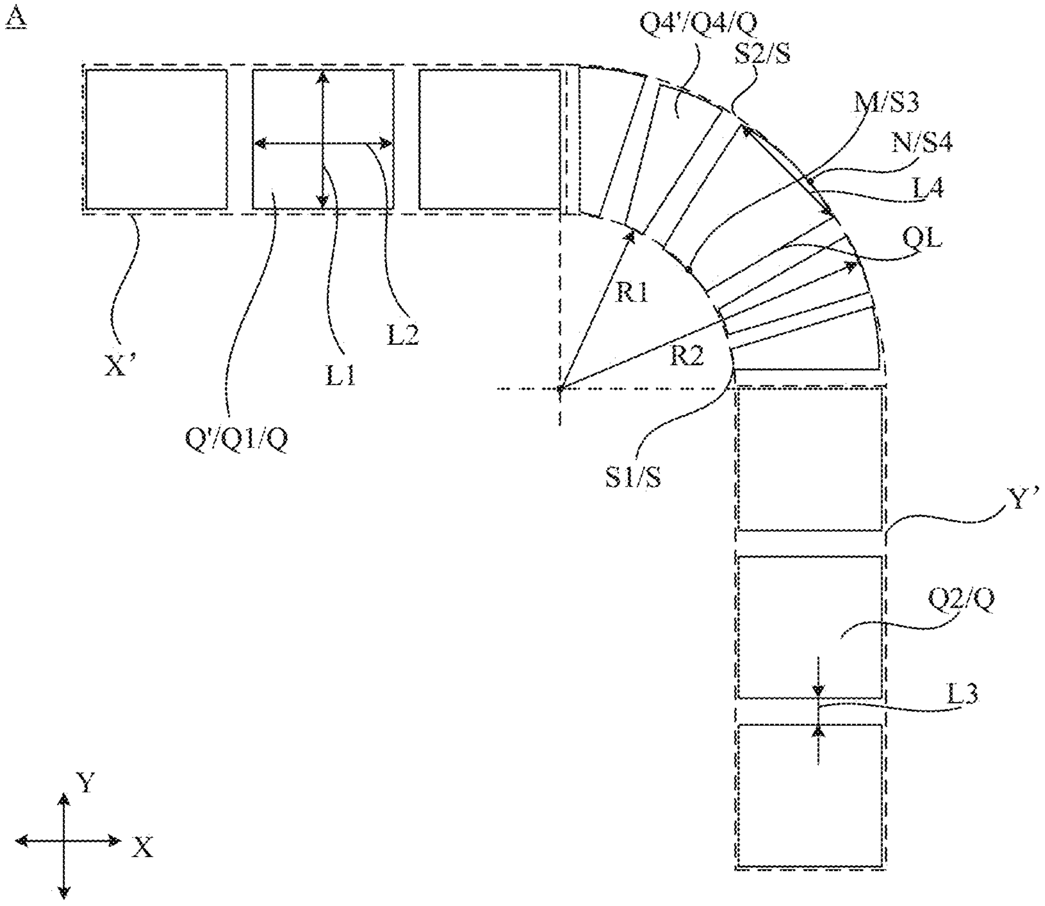
FIG. 6 is a diagram showing another structure corresponding to the region A in FIG. 2.

As shown in FIG. 6, based on the embodiment shown in FIG. 5, at least one turning driving electrode Q4 includes at least two turning sub-electrodes Q4', and sizes of all turning sub-electrodes Q4' are approximately equal. For example, a single turning driving electrode Q4 may be divided into two turning sub-electrodes Q4' with equal areas and the same shapes. For example, the single turning driving electrode Q4 includes the same two turning sub-electrodes Q4' in the shape of the ring sector, a lengths of a side edge (an edge perpendicular to the transport direction of the droplet 3) of the turning sub-electrode Q4' is approximately equal to the first dimension L1 of the reference electrode Q', an inner arc edge of the turning sub-electrode Q4' coincides with the third arc edge S3, and an outer arc edge thereof coincides with the fourth arc edge S4. In the embodiments of the present disclosure, the turning driving electrode Q4 formed by the two turning sub-electrodes Q4' conforms the turning driving electrode Q4 in the foregoing embodiments. Through the design of the turning sub-electrodes Q4', accurate control over the droplet 3 may be achieved, so as to prevent poor control caused by a volume fluctuation of the droplet 3, thereby further improving the stability of driving the droplet 3. In the design process, the number of the electrodes in the shape of the ring sector may be increased according to needs.

Figure 7:
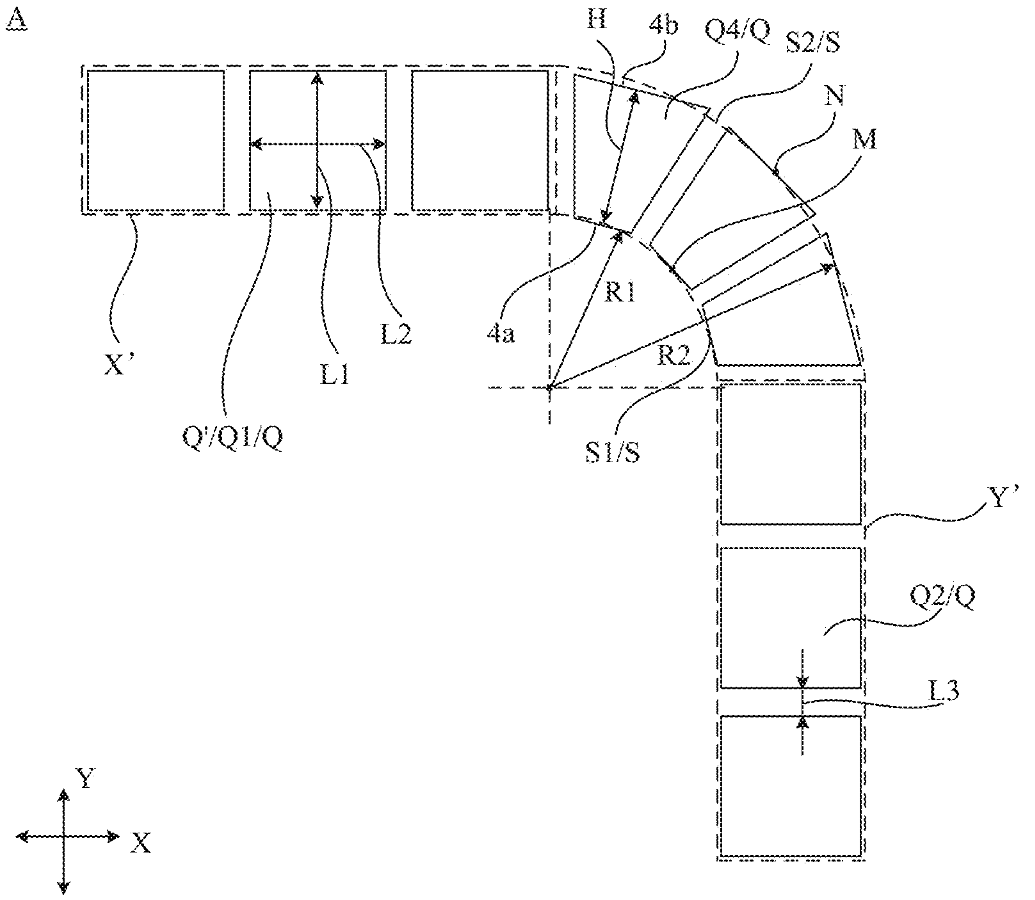
FIG. 7 is a diagram showing yet another structure corresponding to the region A in FIG. 2.

As shown in FIG. 7, in some embodiments, the shape of the turning driving electrode Q4 is substantially the isosceles trapezoid. A midpoint of a short base 4*a* of the turning driving electrode Q4 is as a first reference point M that coincides with the first arc edge S1, and a midpoint of a long base 4*b* of the turning driving electrode Q4 is as a second reference point N that coincides with the second arc edge S2. In the embodiments of the present disclosure, the channel formed by the turning driving electrodes Q4 in the turning region S has a smooth bending angle, so as to avoid a situation that the droplet 3 is prone to being out of the borders of the driving electrodes Q due to a turning at a straight corner, thereby improving the stability of the microfluidic chip 100.

As shown in FIG. 7, in exemplary embodiments, the first direction X and the second direction Y are perpendicular to each other (i.e., the channel for the droplet 3 has the corner of 90°). The first straight driving electrodes Q1 and the second straight driving electrodes Q2 are approximately the same in shape, and approximately equal in area. The shape of the turning driving electrode Q4 is a regular isosceles trapezoid. A length of a height H (perpendicular to the long base and the short base) of the turning driving electrode Q4 is approximately equal to the first dimension L1 of the reference electrode Q', the midpoint of the short base of the turning driving electrode Q4 is as the first reference point M that coincides with the first arc edge S1, and the midpoint of the long base of the turning driving electrode Q4 is as the second reference point N that coincides with the second arc edge S2. That is, a radius of curvature of the turning driving electrode Q4 at the middle point of the short base is approximately equal to the radius R1 of the first arc edge S1, and a radius of curvature of the turning driving electrode Q4 at the middle point of the long base is approximately equal to the radius R2 of the second arc edge S2. The radius R1 of the first arc edge S1 is greater than the first dimension L1 of the reference electrode Q', and the radius R2 of the second arc edge S2 is greater than 2 times of the first dimension L1 of the reference electrode Q'. For example, the radius R1 of the first arc edge S1 is the sum of the first dimension L1 of the reference electrode Q' and the width L3 of the gap between the reference electrode Q' and the straight electrode adjacent thereto, and the radius R2 of the second arc edge S2 is the sum of 2 times of the first dimension L1 of the reference electrode Q' and the width L3 of the gap between the reference electrode Q' and the straight electrode adjacent thereto. In the embodiments of the present disclosure, a leg of a turning driving electrode Q4 and an edge of the reference electrode Q' are parallel to each other, and legs that are proximate to each other of two adjacent turning driving electrodes Q4 are parallel to each other, so that the channel formed by the turning driving electrodes Q in the turning region S has the smooth bending angle, thereby avoiding the 90° right-angle turning of the droplet 3 and improving the stability of the microfluidic chip 100. In addition, the driving electrode Q in the shape of the isosceles trapezoid may reduce a difficulty of manufacturing.

In the embodiments of the present disclosure, the shape of the channel formed by the turning driving electrodes Q4 in the turning region S and the shape of the droplet 3 formed due to the electrowetting on dielectric effect when the droplet 3 turns are approximately the same. Therefore, the smooth turning and transport of the droplet 3 in the turning region S may be ensured, and the droplet 3 may be prevented from being out of the driving electrodes Q, so that the stability of the microfluidic chip 100 may be improved. In addition, in the embodiments of the present disclosure, the width (the dimension perpendicular to the transport direction of the droplet 3) of the droplet 3 in the turning process is always approximately equal to the first dimension L1 of the reference electrode Q', and the shape thereof is hardly changed, so that the stability of the transport of the droplet 3 at the corner may be further improved.

Figure 8:
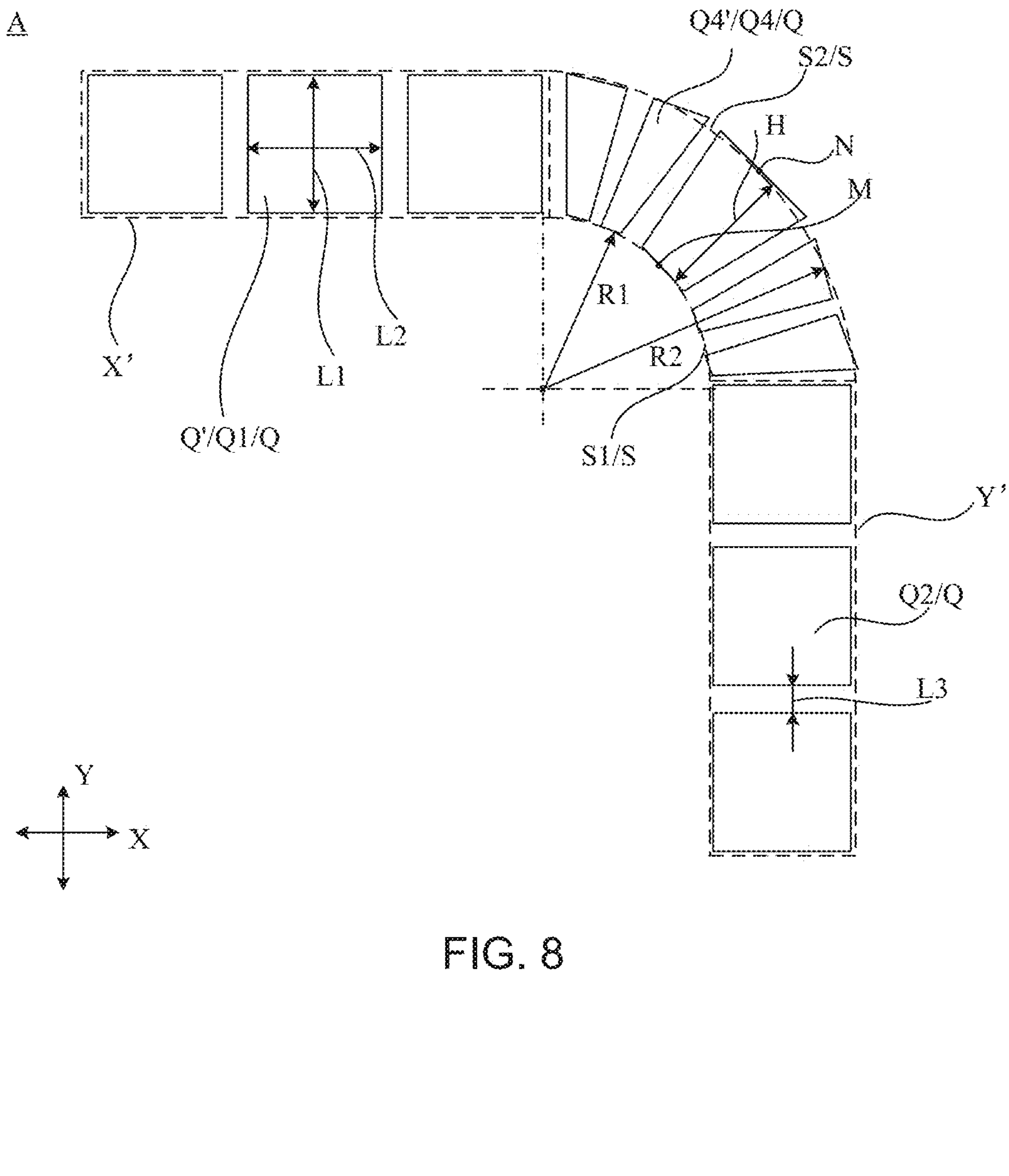
FIG. 8 is a diagram showing yet another structure corresponding to the region A in FIG. 2.

As shown in FIG. 8, based on the embodiment shown in FIG. 7, at least one turning driving electrode Q4 includes at least two turning sub-electrodes Q4', and sizes of all turning sub-electrodes Q4' are approximately equal. For example, a single turning driving electrode Q4 may be divided into two turning sub-electrodes Q4' with equal areas and the same shapes. For example, the single turning driving electrode Q4 includes the same two turning sub-electrodes Q4' in the shape of the isosceles trapezoid, and a length of a height H (perpendicular to a short base and a long base) of the turning sub-electrode Q4' is approximately equal to the first dimension L1 of the reference electrode Q'. In the embodiments of the present disclosure, the turning driving electrode Q4 formed by the two turning sub-electrodes Q4' conforms the turning driving electrode Q4 in the foregoing embodiments. Through the design of the turning sub-electrode Q4', accurate control over the droplet 3 may be achieved, so as to prevent poor control caused by the volume fluctuation of the droplet 3, thereby further improving the stability of driving the droplet 3. In the design process, the number of the electrodes in the shape of isosceles trapezoid may be increased according to needs.

As shown in FIGS. 5 to 8, in some embodiments, the plurality of turning driving electrodes Q4 are approximately the same in shape, and approximately equal in area. The turning driving electrodes Q4 are approximately the same, so as to reduce shape changes of the droplet 3 in the transport process, thereby further improving the stability of the transport of the droplet 3.

In some embodiments, the number of turning driving electrodes Q4 in the turning region S may be equal to the number of driving electrodes Q occupied by the droplet 3. For example, in the embodiments shown in FIGS. 5 to 8, the droplet 3 may occupy areas of three driving electrodes Q, and thus the turning region S is provided with three turning driving electrodes Q4 therein. In this case, correspondingly, the radius R1 of the first arc edge S1 of the turning region S may be greater than the first dimension L1 of the reference electrode Q', and the radius R2 of the second arc edge S2 of the turning region S may be greater than 2 times of the first dimension L1 of the reference electrode Q'.

Figure 9:
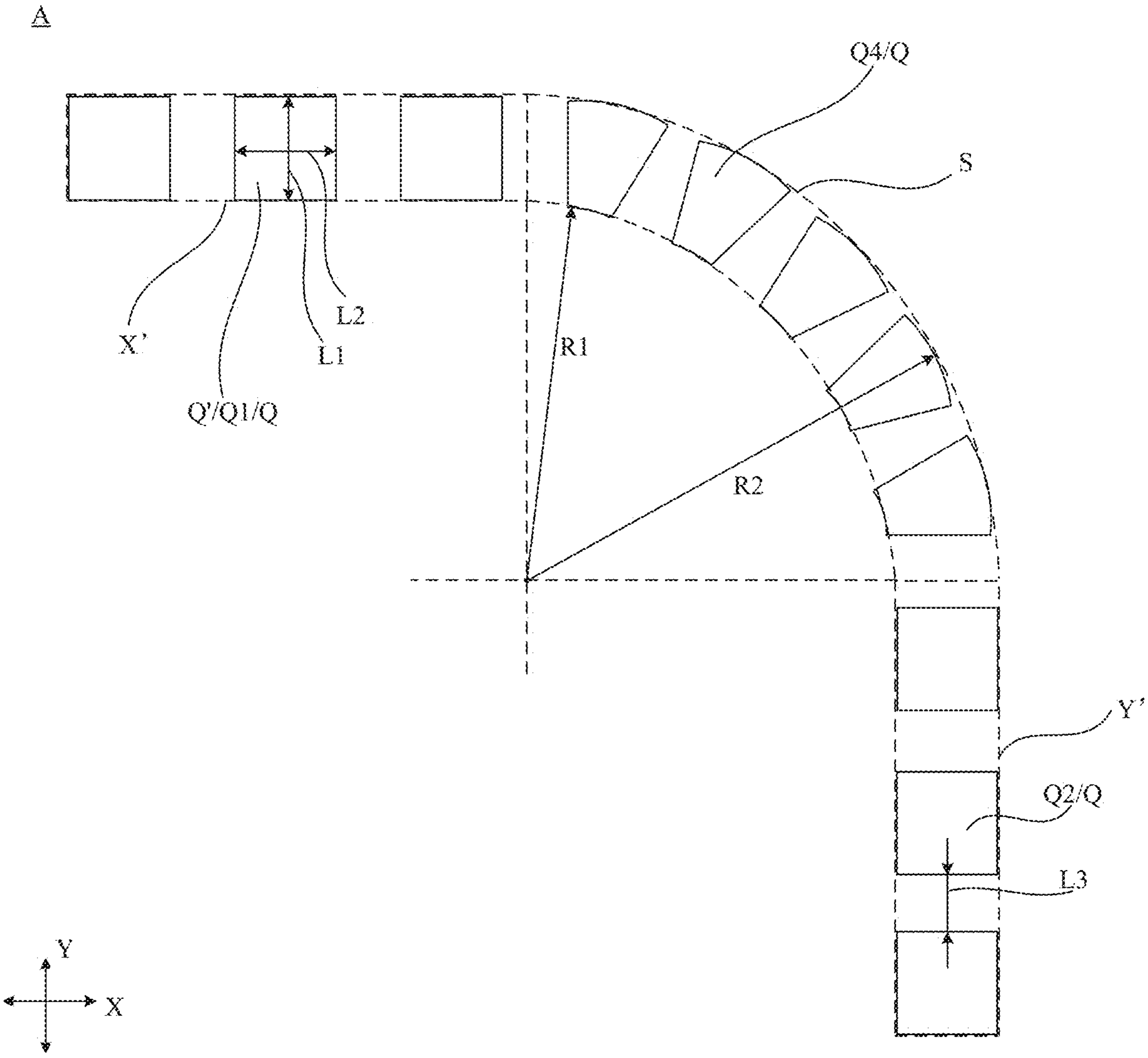
FIG. 9 is a diagram showing yet another structure corresponding to the region A in FIG. 2.

In some other embodiments, the number of turning driving electrodes Q4 in the turning region S may be greater than the number of driving electrodes Q occupied by the droplet 3. As shown in FIG. 9, in exemplary embodiments, the turning region S is provided with five turning driving electrodes Q4 therein, the turning driving electrodes Q4 are each in the shape of the ring sector, an arc edge of an inner ring of the turning driving electrode Q4 substantially coincides with the first arc edge S1 of the turning region S. and an arc edge of an outer ring thereof substantially coincides with the second arc edge S2 of the turning region S. In this case, correspondingly, the radius R1 of the first arc edge S1 of the turning region S may be greater than 2 times of the first dimension L1 of the reference electrode Q', and the radius R2 of the second arc edge S2 of the turning region S may be greater than 3 times or 4 times of the first dimension L1 of the reference electrode Q'. For example, the radius R1 of the first arc edge S1 of the turning region S may be a sum of 2 times of the first dimension L1 of the reference electrode Q' and 2 times of the width L3 of the gap between the reference electrode Q' and the straight electrode adjacent thereto, and the radius R2 of the second arc edge S2 of the turning region S may be a sum of 3 times of the first dimension L1 of the reference electrode Q' and 2 times of the width L3 of the gap between the reference electrode Q' and the straight electrode adjacent thereto. This design may further increase the radius of curvature of the droplet 3 when it is transported in the turning region S, so as to further improve the stability of driving the droplet 3. The number of the turning driving electrodes Q4 in these embodiments may increase as the radius R1 of the first arc edge S1 increases.

In optional embodiments, based on the embodiment shown in FIG. 9, the turning region S is provided with five turning driving electrodes Q4 therein, at least one turning driving electrode Q4 includes at least two turning sub-electrodes Q4', and sizes of all turning sub-electrodes Q4' are approximately equal. For example, the turning driving electrode Q4 is in the shape of the ring sector, and the single turning driving electrode Q4 may be divided into two turning sub-electrodes Q4' with the equal areas and the same shapes. For example, the single turning driving electrode Q4 includes the same two turning sub-electrodes Q4' in the shape of the ring sector, and the length of the side edge (the edge perpendicular to the transport direction of the droplet 3) of the turning sub-electrode Q4' is approximately equal to the first dimension L1 of the reference electrode Q'. In the embodiments of the present disclosure, the turning driving electrode Q4 formed by the two turning sub-electrodes Q4' conforms the turning driving electrode Q4 in the foregoing embodiments. Through the design of the turning sub-electrode Q4', accurate control over the droplet 3 may be achieved, so as to prevent poor control caused by the volume fluctuation of the droplet 3, thereby further improving the stability of driving the droplet 3. In the design process, the number of the turning sub-electrodes Q4' may be increased according to needs.

Figure 10:
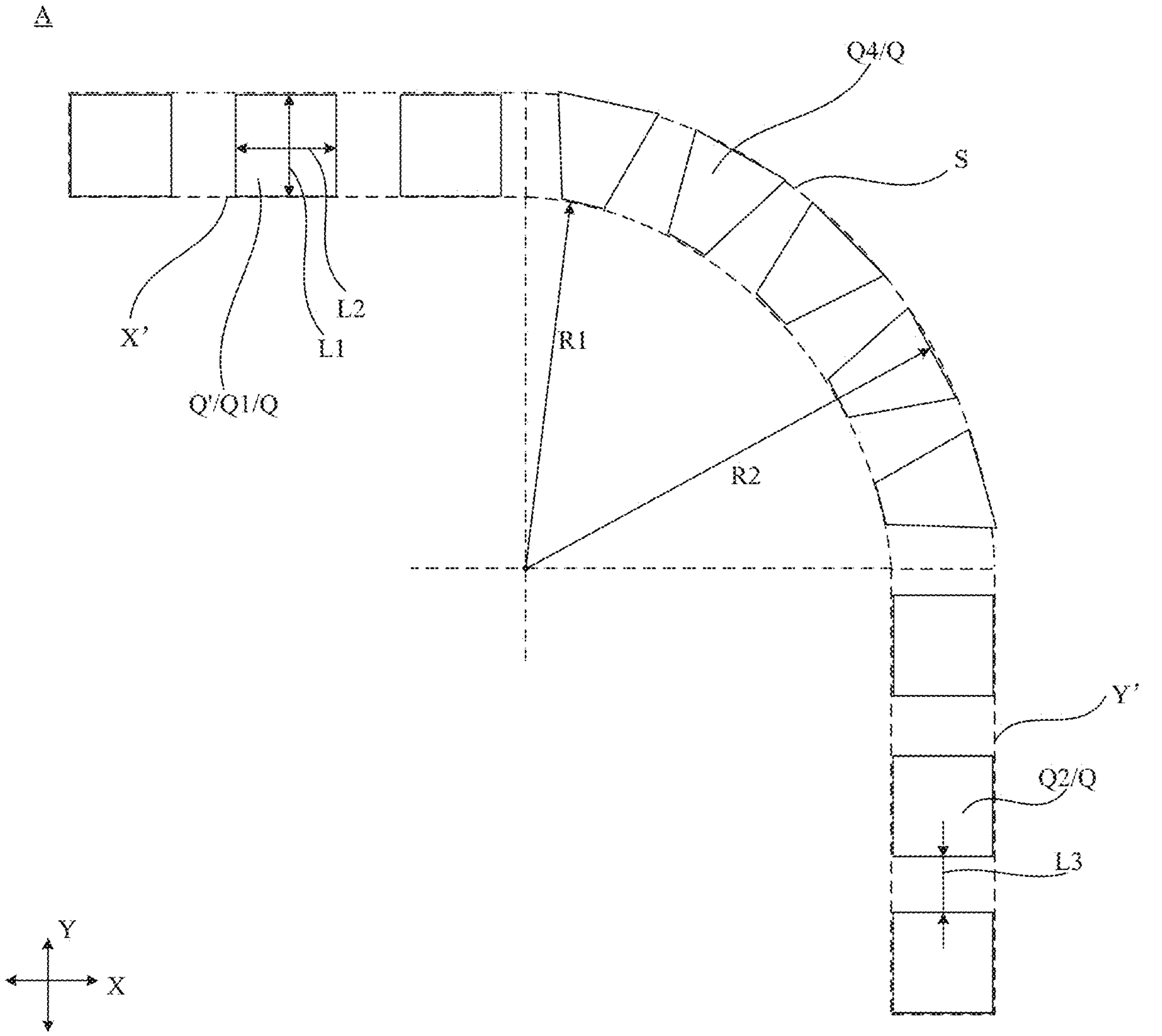
FIG. 10 is a diagram showing yet another structure corresponding to the region A in FIG. 2.

As shown in FIG. 10, in exemplary embodiments, the turning region S is provided with five turning driving electrodes Q4 therein, and the turning driving electrodes Q4 are each in the shape of the isosceles trapezoid. The short base of the turning driving electrode Q4 substantially coincides with the first arc edge S1 of the turning region S, and the long base thereof substantially coincides with the second arc edge S2 of the turning region S. In this case, correspondingly, the radius R1 of the first arc edge S1 of the turning region S may be greater than 2 times of the first dimension L1 of the reference electrode Q', and the radius R2 of the second arc edge S2 of the turning region S may be greater than 3 times or 4 times of the first dimension L1 of the reference electrode Q'. For example, the radius R1 of the first arc edge S1 of the turning region S may be the sum of 2 times of the first dimension L1 of the reference electrode Q' and 2 times of the width L3 of the gap between the reference electrode Q' and the straight electrode adjacent thereto, and the radius R2 of the second arc edge S2 of the turning region S may be the sum of 3 times of the first dimension L1 of the reference electrode Q' and 2 times of the width L3 of the gap between the reference electrode Q' and the straight electrode adjacent thereto. This design may also further increase the radius of curvature of the droplet 3 when it is transported in the turning region S, so as to further improve the stability of driving the droplet 3. The number of the turning driving electrodes Q4 in these embodiments may increase as the radius R1 of the first arc edge S1 increases.

In optional embodiments, based on the embodiment shown in FIG. 10, the turning region S is provided therein with five turning driving electrodes Q4 in the shape of the isosceles trapezoid, at least one turning driving electrode Q4 includes at least two turning sub-electrodes Q4', and sizes of all turning sub-electrodes Q4' are approximately equal. For example, the single turning driving electrode Q4 may be divided into two turning sub-electrodes Q4' with the equal areas and the same shapes, and the turning sub-electrodes Q4' are also in the shape of the isosceles trapezoid. Through the design of the turning sub-electrode Q4', accurate control over the droplet 3 may be achieved, so as to prevent poor control caused by the volume fluctuation of the droplet 3, thereby further improving the stability of driving the droplet 3. In the design process, the number of the turning sub-electrodes Q4' may be increased according to needs.

In exemplary embodiments, a maximum dimension of a line segment, that is tangent to the transport direction of the droplet 3 in the turning region S, of each turning driving electrode Q4 is less than the second dimension L2 of the reference electrode Q'. The second dimension L2 of the reference electrode Q' is the dimension of the edge, in the transport direction of the droplet 3, of the reference electrode Q'. For example, in the embodiment shown in FIG. 5, a maximum dimension of a chord L4 corresponding to the fourth arc edge S4 is less than the second dimension L2 of the reference electrode Q'; and in the embodiment shown in FIG. 7, a maximum dimension of the long base of the turning driving electrode Q4 is less than the second dimension L2 of the reference electrode Q'. By controlling the area of the turning driving electrode Q4 to be approximately equal to or less than an area of the reference electrode Q', shape changes of the droplet 3 in the turning region S during the turning and the transport may be reduced, and the stability of the transport of the droplet 3 may be further improved.

Figure 11:
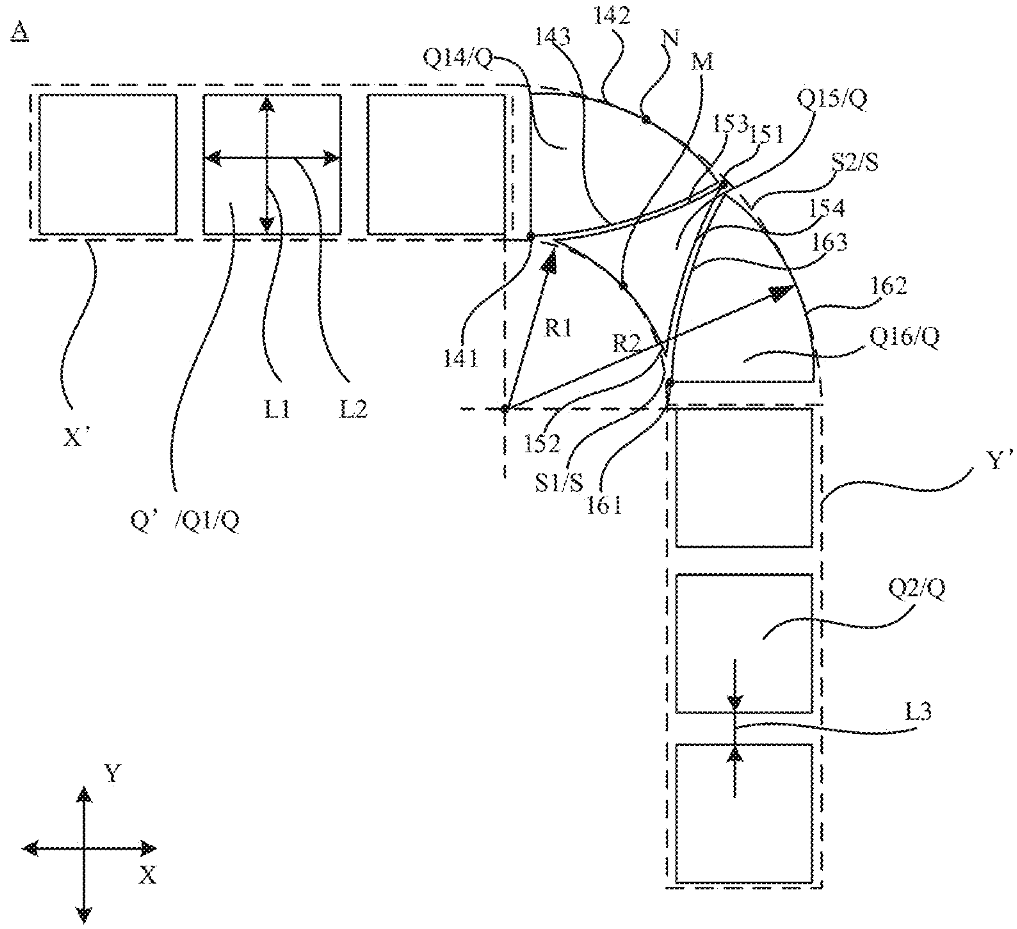
FIG. 11 is a diagram showing yet another structure corresponding to the region A in FIG. 2.
Figure 12:
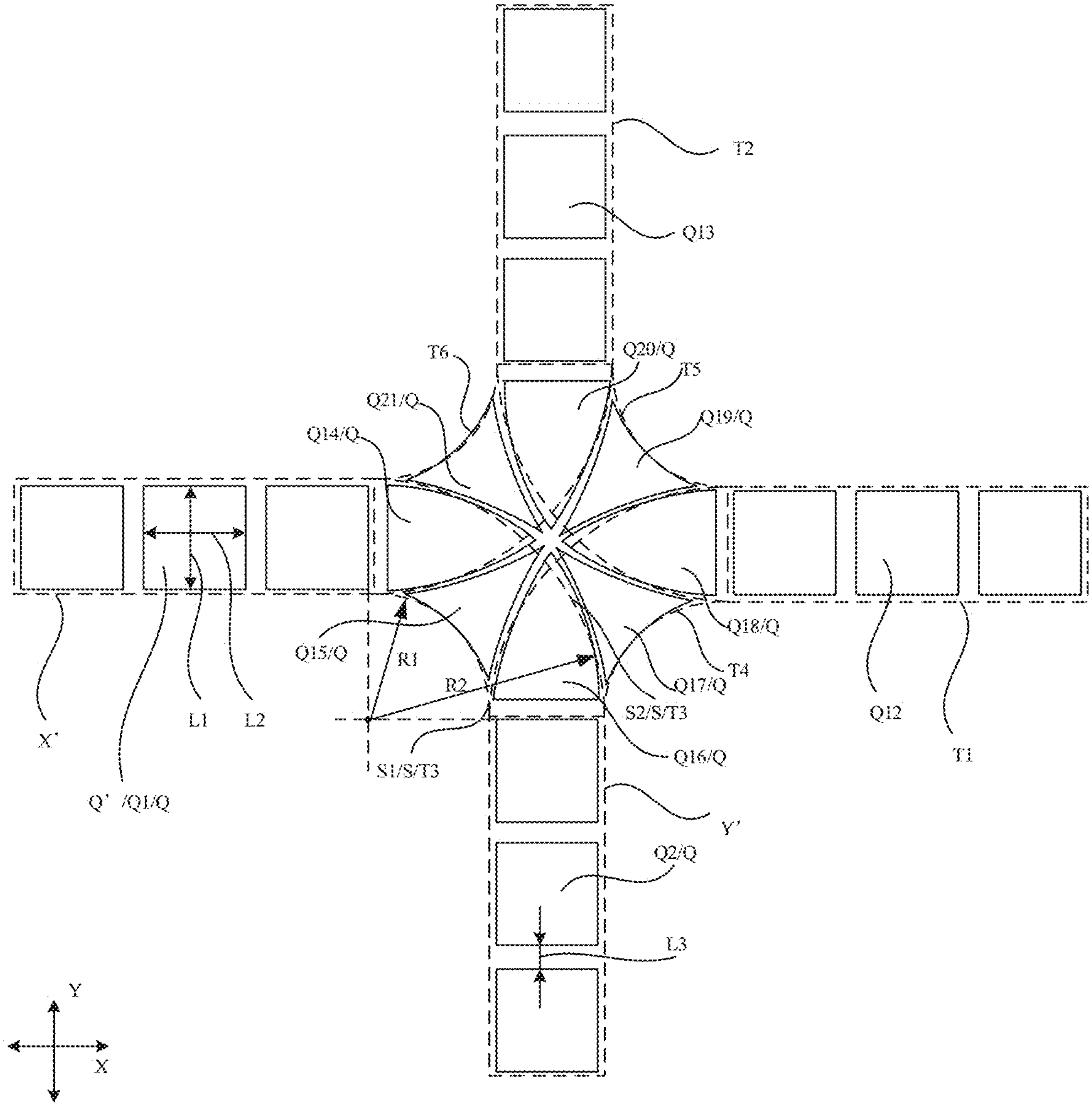
FIG. 12 is a diagram showing a structure adding two channels based on the structure in FIG. 11.

As shown in FIGS. 11 and 12, in some embodiments, the shape of the turning driving electrode Q4 is substantially the quasi-triangle. At least one point of an arc edge of at least one turning driving electrode Q4 is as the at least one first reference point M that coincides with the first arc edge S1, and at least one point of an arc edge of another at least one turning driving electrode Q4 is as the at least one second reference point N that coincides with the second arc edge S2. That is, an arc edge in the three edges of at least one quasi-triangle coincides with an arc edge of the turning region S, so that a border of the channel for the droplet 3 to pass through formed by the turning driving electrodes Q4 to be of an arc-shape, thereby improving the smoothness of the droplet 3 when it passes through the channel, and improving the stability of the microfluidic chip 100.

An edge, proximate to a first straight driving electrode Q1, of a turning driving electrode Q4 adjacent to the first straight driving electrode Q1 is a straight edge; and an edge, proximate to a second straight driving electrode Q2, of another turning driving electrode Q4 adjacent to the second straight driving electrode Q2 is a straight edge. The plurality of turning driving electrodes Q4 are spliced into a ring sector in the transport direction of the droplet 3. Thus, when the droplet 3 passes through the turning region S, the droplet 3 has a radius of curvature of turning with a high curvature, so that the droplet 3 may be transported smoothly, and in turn, the stability of the microfluidic chip 100 may be improved.

As shown in FIG. 11, in exemplary embodiments, the first direction X and the second direction Y are perpendicular to each other (i.e., the channel for the droplet 3 has the corner of 90°), the shapes of the first straight driving electrodes Q1 and the second straight driving electrodes Q2 are approximately the same, and the areas of the first straight driving electrodes Q1 and the second straight driving electrodes Q2 are approximately equal. The shapes of the turning driving electrodes Q4 are the quasi-triangles.

The plurality of turning driving electrodes Q4 include a first turning electrode Q14, a second turning electrode Q15 and a third turning electrode Q16 arranged sequentially in the transport direction of the droplet 3. As shown in FIG. 11, a shape of the first turning electrode Q14 and a shape of the third turning electrode Q16 are the same. A vertex 141 of the first turning electrode Q14 and a vertex 161 of the third turning electrode Q16 are as the first reference points M that coincides with the first arc edge S1, and an arc edge 142 of the first turning electrode Q14 and an arc edge 162 of the third turning electrode Q16 both coincide with the second arc edge S2. A vertex 151 of the second turning electrode Q15 is as a second reference point N that coincides with the second arc edge S2, and an arc edge 152 of the second turning electrode Q15 coincides with the first arc edge S1. The turning driving electrodes Q4 located in the turning region S are designed as quasi-triangles with different shapes and positions of the different quasi-triangles are restricted each other, so that a smooth transition of the channel for the transport of the droplet 3 in the turning region S may be achieved. As a result, a relatively sharp corner in the channel may be avoided, thereby preventing the droplet 3 from slipping from the corner in the transport process, and improving the stability of the microfluidic chip 100.

Optionally, an edge 143 of the first turning electrode Q14 and an edge 153 of the second turning electrode Q15 that are proximate to each other are both straight edges, and the two straight edges are parallel to each other. Alternatively, an edge 163 of the third turning electrode Q16 and an edge 154 of the second turning electrode Q15 that are proximate to each other are both straight edges, and the two straight edges are parallel to each other. Alternatively, the edge 143 of the first turning electrode Q14 and the edge 153 of the second turning electrode Q15 that are proximate to each other are both arc edges, and shapes of the two arc edges match. Alternatively, the edge 163 of the third turning electrode Q16 and the edge 154 of the second turning electrode Q15 that are proximate to each other are both arc edges, and shapes of the two arc edges match.

Optionally, the first turning electrode Q14 is in a shape of an isosceles quasi-triangle, and/or the third turning electrode Q16 is in the shape of the isosceles quasi-triangle. That is, two edges of the three edges of the first turning electrode Q14 are straight edges with equal lengths, and/or two edges of the three edges of the third turning electrode Q16 are straight edges with equal lengths. A base (an edge connecting with two legs) of the first turning electrode Q14 is of an arc-shape and coincides with the second arc edge S2, and/or a base (an edge connecting with two legs) of the third turning electrode Q16 is of an arc-shape and coincides with the second arc edge S2.

As shown in FIG. 12, in exemplary embodiments, the microfluidic chip 100 includes four channels. For example, the turning region S connecting the first straight region X' and the second straight region Y' in FIG. 11 is the first turning region T3. Based on the embodiment shown in FIG. 11, the microfluidic substrate 1 further has a third straight region T1, a fourth straight region T2, a second turning region T4, a third turning region T5 and a fourth turning region T6. The third straight region T1 extends in the first direction X, and the third straight region T1 and the first straight region X' are arranged on both sides of a region surrounded by the first turning region T1, the second turning region T2, the third turning region T3 and the fourth turning region T4 in the first direction X. The fourth straight region T2 extends in the second direction Y, and the fourth straight region T2 and the second straight region Y' are arranged on both sides of the region surrounded by the first turning region T1, the second turning region T2, the third turning region T3 and the fourth turning region T4 in the second direction Y. Both ends of the second turning region T4 are respectively connected to the second straight region Y' and the third straight region T1, both ends of the third turning region T5 are respectively connected to the third straight region T1 and the fourth straight region T2, and both ends of the fourth turning region T6 are respectively connected to the fourth straight region T2 and the first straight region X'. In the embodiments of the present disclosure, there are four directions for the droplet 3 to be transported, which may improve diversity of electrode patterns formed by the driving electrodes Q and make application scenarios of the microfluidic chip 100 more comprehensive.

Optionally, as shown in FIG. 12, a portion of the first turning region T3 connected to the second straight region Y' coincides with a portion of the second turning region T4 connected to the second straight region Y', a portion of the second turning region T4 connected to the third straight region T1 coincides with a portion of the third turning region T5 connected to the third straight region T1, a portion of the third turning region T5 connected to the fourth straight region T2 coincides with a portion of the fourth turning region T6 connected to the fourth straight region T2, and a portion of the fourth turning region T6 connected to the first straight region X' coincides with a portion of the first turning region T3 connected to the first straight region X'. Two adjacent turning regions in the first turning region T3, the second turning region T4, the third turning region T5 and the fourth turning region T6 overlap one another, so that some of the turning driving electrodes Q4 forming the four channels may be used multiple times. As a result, the number of the turning driving electrodes Q4 is reduced, an area occupied by the turning driving electrodes Q4 is reduced, and a layout design of the microfluidic chip 100 is optimized.

Optionally, as shown in FIG. 12, the microfluidic substrate 1 further includes a plurality of third straight driving electrodes Q12, a plurality of fourth straight driving electrodes Q13, a fourth turning electrode Q17, a fifth turning electrode Q18, a sixth turning electrode Q19, a seventh turning electrode Q20 and an eighth turning electrode Q21. The plurality of third straight driving electrodes Q12 are arranged in the first direction X and are located in the third straight region T1. The plurality of fourth straight driving electrodes Q13 are arranged in the second direction Y and are located in the fourth straight region T2. Shapes of the third straight driving electrodes Q12 and the fourth straight driving electrodes Q13 are substantially rectangles. The first turning electrode Q14 and the fifth turning electrode Q18 have the same shape and are symmetrically arranged, the second turning electrode Q15 and the sixth turning electrode Q19 have the same shape and are symmetrically arranged, the third turning electrode Q16 and the seventh turning electrode Q20 have the same shape and are symmetrically arranged, and the fourth turning electrode Q17 and the eighth turning electrode Q21 have the same shape and are symmetrically arranged. The shapes of adjacent turning electrodes in the fourth turning electrode Q17, the fifth turning electrode Q18, the sixth turning electrode Q19, the seventh turning electrode Q20 and the eighth turning electrode Q21 match one another, so as to form four channels with regular shapes, thereby reducing the difficulty of manufacturing the turning driving electrodes Q while satisfying the smooth transport of the droplet 3 in the four channels.

Optionally, as shown in FIG. 12, the third turning electrode Q16, the fourth turning electrode Q17 and the fifth turning electrode Q18 are located in the second turning region T4; the fifth turning electrode Q18, the sixth turning electrode Q19 and the seventh turning electrode Q20 are located in the third turning region T5; and the seventh turning electrode Q20, the eighth turning electrode Q21 and the first turning electrode Q14 are located in the fourth turning region T6.

In optional embodiments, the microfluidic chip 100 includes a plurality of channels. For example, the microfluidic chip 100 includes five channels, each channel includes a turning region that is formed by turning driving electrodes Q4, and the turning driving electrodes Q4 may be spliced into a ring sector in the transport direction of the droplet 3. For example, all turning driving electrodes Q4 for the turning of the droplet 3 in the five channels may be spliced into a regular pentagon.

As shown in FIGS. 5 to 12, in some embodiments, an included angle between the first direction X and the second direction Y is a right angle. Through the design of the shape of the turning driving electrode Q4, the transport channel in the turning region S for the droplet 3 has a smooth angle, so as to achieve the stable turning and transport of the droplet 3, thereby improving the stability of the microfluidic chip 100.

Figure 13:
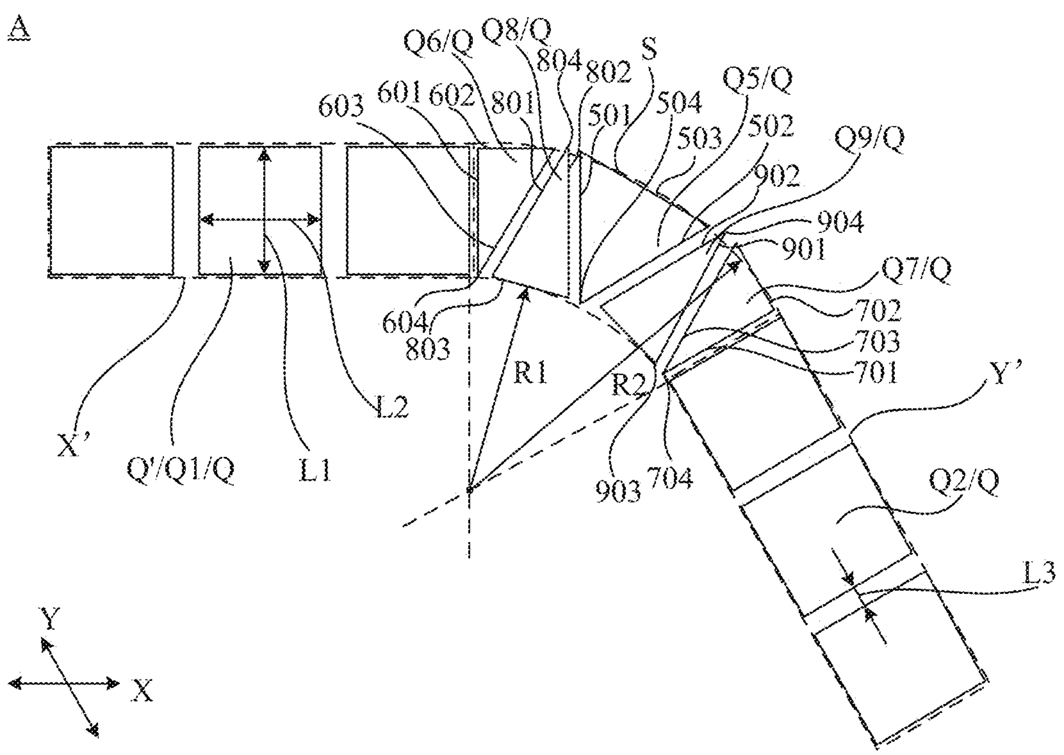
FIG. 13 is a diagram showing yet another structure corresponding to the region A in FIG. 2.
Figure 14:
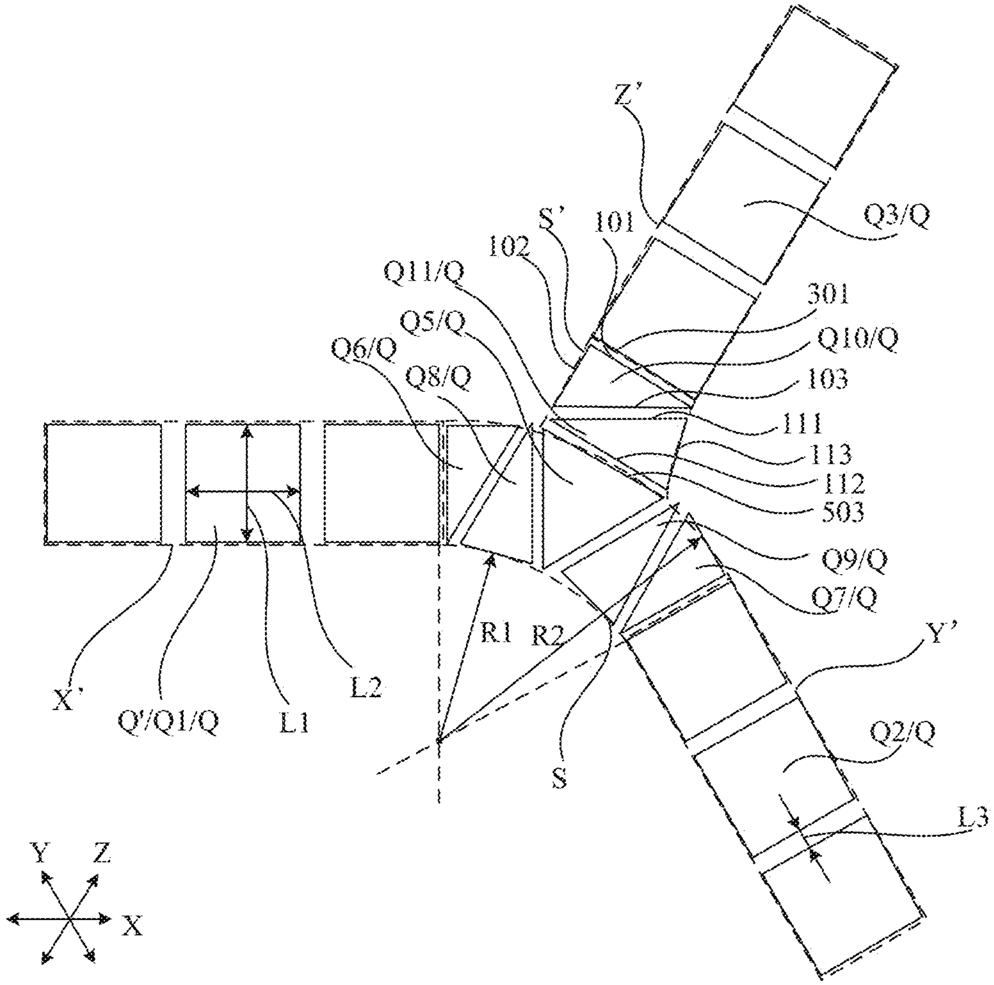
FIG. 14 is a diagram showing a structure adding a single channel based on the structure in FIG. 13.

As shown in FIGS. 13 and 14, in some embodiments, the included angle between the first direction X and the second direction Y is an obtuse angle. Through the design of the obtuse angle, the microfluidic chip 100 may be designed with a variety of different electrode patterns, so as to be applied to different process scenarios. However, in an obtuse-angled transport channel, conventional driving electrodes Q still have a sharp corner, which makes it easy for the droplet 3 to be out of the borders of the driving electrodes Q due to the action of the surface tension, thereby reducing the stability of the microfluidic chip 100.

In some embodiments, as shown in FIG. 13, the plurality of turning driving electrodes Q4 include a central electrode Q5, a first sub-electrode Q6, a second sub-electrode Q7, a third sub-electrode Q8 and a fourth sub-electrode Q9. The central electrode Q5 is in a shape of an isosceles triangle, two legs 501 and 502 of the central electrode Q5 are respectively perpendicular to the first direction X and the second direction Y. The first sub-electrode Q6 is in a shape of a right triangle, a long right-angle edge 601 of the first sub-electrode Q6 is adjacent to the first straight driving electrode Q1, and the long right-angle edge 601 thereof is substantially perpendicular to the first direction X. The second sub-electrode Q7 is in a shape of a right triangle, a long right-angle edge 701 of the second sub-electrode Q7 is adjacent to the second straight driving electrode Q2, and the long right-angle edge 701 thereof is substantially perpendicular to the second direction Y. The third sub-electrode Q8 is in a shape of an isosceles triangle, the third sub-electrode Q8 is disposed between the first sub-electrode Q6 and the central electrode Q5, and two legs 801 and 802 of the third sub-electrode Q8 are substantially parallel to a hypotenuse 603 of the first sub-electrode Q6 and a leg 501 of the central electrode Q5, respectively. The fourth sub-electrode Q9 is in a shape of an isosceles triangle, the fourth sub-electrode Q9 is disposed between the second sub-electrode Q7 and the central electrode Q5, and two legs 901 and 902 of the fourth sub-electrode Q9 are substantially parallel to a hypotenuse 703 of the second sub-electrode Q7 and another leg 502 of the central electrode Q5, respectively. By designing the turning driving electrodes Q4 located in the turning region S as a plurality of triangles with different shapes and limiting positions of the different triangles, the smooth transition of the channel in the turning region S for the transport of the droplet 3 may be achieved. As a result, the relatively sharp corner in the channel may be avoided, thereby preventing the droplet 3 from slipping from the corner in the transport process, and improving the stability of the microfluidic chip 100.

As shown in FIG. 13, in exemplary embodiments, a vertex 604 of the first sub-electrode Q6 opposite to a short right-angle edge 602 thereof, a midpoint of a base 803 of the third sub-electrode Q8, a vertex 504 of the central electrode Q5 opposite to a base 503 thereof, a midpoint of a base 903 of the fourth sub-electrode Q9 and a vertex 704 of the second sub-electrode Q7 opposite to a short right-angle edge 702 thereof are each as a respective first reference point M that coincides with the first arc edge S1 of the turning region S. A midpoint of the short right-angle edge 602 of the first sub-electrode Q6, a vertex 804 of the third sub-electrode Q8 opposite to the base 803 thereof, a midpoint of the base 503 of the central electrode Q5, a vertex 904 of the fourth sub-electrode Q9 opposite to the base 903 thereof and a midpoint of the short right-angle edge 702 of the second sub-electrode Q7 are each as a respective second reference point N that coincides with the second arc edge S2 of the turning region S. That is, the radius of curvature of each turning driving electrode Q4 at the first reference point M is controlled to be equal to the radius R1 of the first arc edge S1 of the turning region S, and the radius of curvature of each turning driving electrode Q4 at the second reference point N is controlled to be equal to the radius R2 of the second arc edge S2 of the turning region S, so that the border of the channel formed by all the turning driving electrodes Q4 each in the shape of the triangle is approximately the same as the shape of the droplet 3 when it turns. As a result, the droplet 3 may be prevented from being out of the driving electrodes Q, and the stability of the microfluidic chip 100 may be improved.

In exemplary embodiments, lengths of legs of the central electrode Q5 is less than or equal to $\sqrt{2}$ times of the first dimension L1 of the reference electrode Q'. A length of the long right-angle edge of the first sub-electrode Q6 and a length of the long right-angle edge of the second sub-electrode Q7 are both approximately equal to the first dimension L1 of the reference electrode Q', and a length of the hypotenuse of the first sub-electrode Q6 and a length of the hypotenuse of the second sub-electrode Q7 are approximately equal to the lengths of the legs of the central electrode Q5. A length of a leg of the third sub-electrode Q8 and a length of a leg of the fourth sub-electrode Q9 are approximately equal to the lengths of the legs of the central electrode Q5, and a length of the base of the third sub-electrode Q8 and a length of the base of the fourth sub-electrode Q9 are approximately equal to a length of the short right-angle edge of the first sub-electrode Q6 and a length of the short right-angle edge of the second sub-electrode Q7, respectively. Through mutual limitation of dimensions between each turning driving electrode Q4 in the shape of the triangle and the reference electrode Q', the channel in the turning region S is substantially in the shape of the ring sector, thereby avoiding the sharp corner in the channel, reducing a possibility of the droplet 3 being out of the driving electrodes Q, and improving the stability of the microfluidic chip 100.

In exemplary embodiments, the lengths of the legs of the central electrode Q5 is $$\frac{\sqrt{5}}{2}$$

short right-angle edge of the first sub-electrode Q6 and the length of the short right-angle edge of the second sub-electrode Q7 are both ½ times of the second dimension L2 of the reference electrode Q'. The second dimension L2 of the reference electrode Q' is the dimension of the edge, in the transport direction of the droplet 3, of the reference electrode Q'.

In exemplary embodiments, the radius R2 of the second arc edge S2 of the turning region S is $\sqrt{3}$ times of the first dimension L1 of the reference electrode Q'.

In exemplary embodiments, the included angle between the first direction X and the second direction Y is approximately 120°, and the central electrode Q5 is in a shape of an equilateral triangle.

Optionally, the included angle between the first direction X and the second direction Y is approximately 120°. The central electrode Q5 is in the shape of the equilateral triangle, a length of each leg of the central electrode Q5 is times of the $$\frac{\sqrt{5}}{2}$$

first dimension L1 of the reference electrode Q', and in this case, a height of the central electrode Q5 is equal to the first dimension L1 of the reference electrode Q'. In a case where a vertex of the central electrode Q5 and a midpoint of an edge thereof opposite to the vertex are respectively as the first reference point M and second reference point N, it is indicated that a difference between the radius R1 of the first arc edge S1 and the radius R2 of the second arc edge S2 is equal to the first dimension L1 of the reference electrode Q'. In this case, if the radius R2 of the second arc edge S2 of the turning region S is $\sqrt{3}$ times of the first dimension L1 of the reference electrode Q', it is indicated that the radius R1 of the first arc edge S1 of the turning region S is $\sqrt{3}-1$ times of the first dimension L1 of the reference electrode Q'.

Optionally, the included angle between the first direction X and the second direction Y may be an obtuse angle of 100°, 115°, 140°, or 175°, etc.

As shown in FIG. 14, in exemplary embodiments, the microfluidic chip 100 includes three channels. For example, based on the embodiment shown in FIG. 13, the microfluidic substrate 1 further has a turning extension region S', and a fifth straight region Z' extending in a third direction Z. Both ends of the turning extension region S' are respectively connected to the turning region S and the fifth straight region Z'. The microfluidic substrate 1 further includes a plurality of fifth straight driving electrodes Q3, a fifth sub-electrode Q10 and a sixth sub-electrode Q11. The plurality of fifth straight driving electrodes Q3 are arranged in the third direction Z and are located in the fifth straight region Z'; the first direction X, the second direction Y and the third direction Z intersect one another, and the third direction Z is perpendicular to the base 503 of the central electrode Q5. The fifth sub-electrode Q10 is in a shape of a right-angle triangle and located in the turning extension region S'. A long right-angle side 101 of the fifth sub-electrode Q10 is adjacent to the fifth straight driving electrode Q3, and the long right-angle side 101 of the fifth sub-electrode Q10 is substantially perpendicular to the third direction Z. The sixth sub-electrode Q11 is in a shape of an isosceles triangle and located in the turning extension region S'. The sixth sub-electrode Q11 is disposed between the fifth sub-electrode Q10 and the central electrode Q5, and two legs 111 and 112 of the sixth sub-electrode Q11 are respectively parallel to a hypotenuse 103 of the fifth sub-electrode Q10 and the base 503 of the central electrode Q5. The driving electrodes Q (the first straight driving electrodes Q1, the second straight driving electrodes Q2 and the fifth straight driving electrodes Q3) are arranged in three directions that are respectively perpendicular to the three edges of the central electrode Q5, so as to increase the transport directions of the droplet 3 and expand applicable application scenarios of the microfluidic chip 100. In addition, by providing the driving electrodes Q each in a shape of a triangle in the turning region S and the turning extension region S', the droplet 3 has the smooth transport channel when it is transported in each of the three transport directions (the first direction X, the second direction Y and the third direction Z), thereby achieving the stable transport of the droplet 3.

In exemplary embodiments, a length of the long right-angle edge 101 of the fifth sub-electrode Q10 is approximately equal to a first dimension of the fifth straight driving electrode Q3 (i.e., a length of an edge 301, adjacent to the long right-angle edge 101 of the fifth sub-electrode Q10, of the fifth straight driving electrode Q3), and a length of the hypotenuse 103 of the fifth sub-electrode Q10 is approximately equal to a length of the base 503 of the central electrode Q5. The first dimension of the fifth straight driving electrode Q3 is a dimension of an edge 301, perpendicular to the transport direction of the droplet 3, of the fifth straight driving electrode Q3. The lengths of the legs 111 and 112 of the sixth sub-electrode Q11 are approximately equal to the length of the base 503 of the central electrode Q5, and a length of a base 113 of the sixth sub-electrode Q11 is approximately equal to a length of a short right-angle edge 102 of the fifth sub-electrode Q10.

As shown in FIG. 14, an included angle between any two of the first direction X, the second direction Y and the third direction Z is 120°, and the central electrode Q5 is in the shape of the equilateral triangle. The first straight driving electrodes Q1, the second straight driving electrodes Q2 and the fifth straight driving electrodes Q3 are approximately equal in area, and approximately the same in shape. In this case, the vertex of the first sub-electrode Q6 opposite to the short right-angle edge thereof, the midpoint of the base of the third sub-electrode Q8, the vertex of the central electrode Q5 opposite to the base thereof, the midpoint of the base of the fourth sub-electrode Q9 and the vertex of the second sub-electrode Q7 opposite to the short right-angle edge thereof are each as the respective first reference point M that coincides with the first arc edge S1 of the turning region S. The midpoint of the short right-angle edge of the first sub-electrode Q6, the vertex of the third sub-electrode Q8 opposite to the base thereof, the midpoint of the base of the central electrode Q5, the vertex of the fourth sub-electrode Q9 opposite to the base thereof and the midpoint of the short right-angle edge of the second sub-electrode Q7 are each as the respective second reference point N that coincides with the second arc edge S2 of the turning region S.

In optional embodiments, based on the embodiment shown in FIG. 14, the first sub-electrode Q6 and the third sub-electrode Q8 are both inverted, so that curvatures of corners of the three channels are approximately the same. For example, in this embodiment, the midpoint of the short right-angle edge of the first sub-electrode Q6, the vertex of the third sub-electrode Q8 opposite to the base thereof, the vertex of the central electrode Q5 opposite to the base thereof, the midpoint of the base of the fourth sub-electrode Q9 and the vertex of the second sub-electrode Q7 opposite to the short right-angle edge thereof are each as a respective first reference point M that coincides with the first arc edge S1 of the turning region S. The vertex of the first sub-electrode Q6 opposite to the short right-angle edge thereof, the midpoint of the base of the third sub-electrode Q8, the midpoint of the base of the central electrode Q5, the vertex of the fourth sub-electrode Q9 opposite to the base thereof and the midpoint of the short right-angle edge of the second sub-electrode Q7 are each as a respective second reference point N that coincides with the second arc edge S2 of the turning region S. In this case, the curvatures of the three corners respectively formed by the three channels are approximately the same, so as to ensure that the shapes of the droplet 3 when it is respectively transported in the three channels are approximately the same, and thus the stabilities of the droplet 3 when it is respectively transported in the three channels are approximately the same. As a result, a uniformity of results when the droplet 3 is operated in different channels may be ensured, thereby reducing experimental errors.

In exemplary embodiments, the shapes of the first straight driving electrodes Q1 and the second straight driving electrodes Q2 are approximately the same, and the areas of the first straight driving electrodes Q1 and the second straight driving electrodes Q2 are approximately equal.

In exemplary embodiments, a ratio of a first dimension L11 of the first straight driving electrode Q1 to a second dimension L12 of the first straight driving electrode Q1 is 1 to 4; and/or a ratio of a first dimension L21 of the second straight driving electrode Q2 to a second dimension L22 of the second straight driving electrode Q2 is 1 to 4. For example, as shown in FIG. 5, the first straight driving electrode Q1 and the second straight driving electrode Q2 are both in a shape of a square. That is, the ratio of the first dimension L11 of the first straight driving electrode Q1 to the second dimension L12 of the first straight driving electrode Q1 is 1:1, or the ratio of the first dimension L21 of the second straight driving electrode Q2 to the second dimension L22 of the second straight driving electrode Q2 is 1:1. In a case where the ratio is greater than 4:1, a contact area between the droplet 3 and the driving electrodes Q in the driving process is relatively large, which causes friction force therebetween to increase, thereby resulting in the failure of driving the droplet 3.

As shown in FIG. 15, in exemplary embodiments, the shapes of the first straight driving electrodes Q1 and the second straight driving electrodes Q2 are rectangles with equal areas and the same shapes. For example, the ratio of the first dimension L11 of the first straight driving electrode Q1 to the second dimension L12 of the first straight driving electrode Q1 is 4:1, or the ratio of the first dimension L21 of the second straight driving electrode Q2 to the second dimension L22 of the second straight driving electrode Q2 is 4:1. In this embodiment, the positions and the dimensions of the turning driving electrodes Q4 may be designed with reference to any of the foregoing embodiments.

Figure 16:
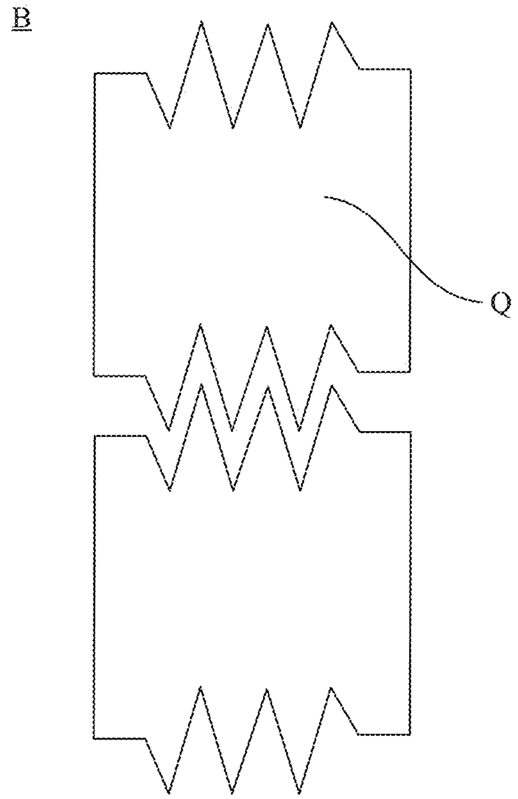
FIG. 16 is a diagram showing a structure corresponding to the region B in FIG. 2.

FIG. 16 is an enlarged view of a region where a dashed box B is located in FIG. 2. As shown in FIG. 16, in exemplary embodiments, two adjacent side edges, perpendicular to the transport direction of the droplet 3, of two adjacent driving electrodes Q are each in a shape of a zigzag and are engaged. The two adjacent driving electrodes Q may be two adjacent first straight driving electrodes Q1, two adjacent second straight driving electrodes Q2, two adjacent fifth straight driving electrodes Q3, two adjacent turning driving electrodes Q4, the first straight driving electrode Q1 and the turning driving electrode Q4 that are adjacent, the second straight driving electrode Q2 and the turning driving electrode Q4 that are adjacent, the fifth straight driving electrode Q3 and the fifth sub-electrode Q10 that are adjacent, the fifth sub-electrode Q10 and the sixth sub-electrode Q11 that are adjacent, or the central electrode Q5 and the sixth sub-electrode Q11 that are adjacent. Through the design of the zigzag, a lap joint between the two adjacent driving electrodes Q is stable, thereby ensuring stable transport of the droplet 3 between the two adjacent driving electrodes Q in the transport process.

For example, the number of sawteeth of at least one side edge with the zigzag design is three, and a depth of a sawtooth is greater than or equal to 0.25 times of the second dimension L2 of the reference electrode Q'.

In some embodiments, the reference electrode Q' is a first straight driving electrode Q1 adjacent to a turning driving electrode Q4 or a second straight driving electrode Q2 adjacent to another turning driving electrode Q4.

In some embodiments, in the turning driving electrode Q4 and the first straight driving electrode Q1 that are adjacent, lengths of two side edges that are proximate to each other are equal; and in the turning driving electrode Q4 and the second straight driving electrode Q2 that are adjacent, lengths of two side edges that are proximate to each other are equal.

In exemplary embodiments, in the transport direction of the droplet 3, a maximum distance between two adjacent first straight driving electrodes Q1 is less than or equal to 10 μm; and/or a maximum distance between two adjacent second straight driving electrodes Q2 is less than or equal to 10 μm; and/or a maximum distance between the two adjacent fifth straight driving electrodes Q3 is less than or equal to 10 μm; and/or a maximum distance between the two adjacent turning driving electrodes Q4 is less than or equal to 10 μm; and/or a maximum distance between the fifth sub-electrode Q10 and the sixth sub-electrode Q11 that are adjacent is less than or equal to 10 μm; and/or a maximum distance between the first straight driving electrode Q1 and the turning driving electrode Q4 that are adjacent is less than or equal to 10 μm; and/or a maximum distance between the second straight driving electrode Q2 and the turning driving electrode Q4 that are adjacent is less than or equal to 10 μm; and/or a maximum distance between the fifth straight driving electrode Q3 and the fifth sub-electrode Q10 that are adjacent is less than or equal to 10 μm; and/or a maximum distance between the central electrode Q5 and the sixth sub-electrode Q11 that are adjacent is less than or equal to 10 μm.

In exemplary embodiments, a maximum distance between two adjacent driving electrodes Q in the turning region S is less than or equal to a maximum distance between two adjacent driving electrodes Q in a straight region (e.g., the first straight region X' or the second straight region Y').

It will be noted that the term "coincide" described in any of the foregoing embodiments is "substantially coinciding". The description of the feature is merely for the purpose of adaptive explanation, and is not intended to cause limitations of positions involved in the embodiments of the present disclosure. Therefore, in combination with the accompanying drawings, a technical feature that two components do not completely coincide but substantially coincide is also included in the protection scope of the present disclosure.

FIG. 17 is a schematic diagram showing a process of transporting the droplet 3 using the microfluidic chip 100 as described in any of the foregoing embodiments. As shown in FIG. 17, in some embodiments, the driving electrodes Q include three first straight driving electrodes Q1(1) to Q1(3) arranged in an array, three turning driving electrodes Q4(1) to Q4(3) arranged in an array and three second straight driving electrodes Q2(1) to Q2(3) arranged in an array. For example, in the transport process of the droplet 3, a sinusoidal signal of 180 Vrms/KHz is used, and an interval between two adjacent times to supply power for the driving electrode Q is 500 ms. In an initial state, the driving voltages of all the driving electrodes Q are OV. First, three first straight driving electrodes Q1(1) to Q1(3) are controlled to be powered on, so as to deform the droplet 3 correspondingly to form a shape shown in (a) in FIG. 17. Then, the turning driving electrode Q4(1) is controlled to be powered on, the first straight driving electrode Q1(1) is controlled to be powered off, the turning driving electrode Q4(2) is controlled to be powered on, the first straight driving electrode Q1(2) is controlled to be powered off, and in this case, the shape of the droplet 3 is as shown in (b) in FIG. 17. Then, the turning driving electrode Q4(3) is controlled to be powered on, the first straight driving electrode Q1(3) is controlled to be powered off, and in this case, the shape of the droplet 3 is as shown in (c) in FIG. 17. Next, the second straight driving electrode Q2(1) is controlled to be powered on, and the turning driving electrode Q4(1) is controlled to be powered off. Finally, the second straight driving electrode Q2(2) is controlled to be powered on, the turning driving electrode Q4(2) is controlled to be powered off, and in this case, the shape of the droplet 3 is as shown in (d) in FIG. 17. As a result, the transition of the transport of the droplet 3 from the first direction X (a horizontal direction) to the second direction Y (a vertical direction) is achieved. It will be seen from the transport process of the droplet 3 illustrated in FIG. 17 that, the microfluidic chip 100 provided in the embodiments of the present disclosure enables the shape of the droplet 3 to approximately coincide with the shape of the driving electrodes Q in the process of turning and transport of the large-size sample, so as to avoid a situation that the droplet 3 is out of the borders of the driving electrodes Q due to an excessively sharp curvature of the corner. As a result, the reliability of the transport of the microfluidic chip 100 for the large-volume sample may be greatly improved, and in turn, the stability of the microfluidic chip 100 may be improved.

The foregoing descriptions are merely specific implementations of the present disclosure, but the protection scope of the present disclosure is not limited thereto. Changes or replacements that any person skilled in the art could conceive of within the technical scope of the present disclosure shall be included in the protection scope of the present disclosure. Therefore, the protection scope of the present disclosure shall be subject to the protection scope of the claims.

What is claimed is:

1. A microfluidic substrate, having a first straight region extending in a first direction, a second straight region extending in a second direction and a first turning region, wherein the first direction intersects the second direction; both ends of the first turning region are respectively connected to the first straight region and the second straight region; the first turning region is substantially of a ring sector; the first turning region includes a first arc edge and a second arc edge that are opposite, and the first arc edge is closer to an inner side of the first turning region than the second arc edge;

the microfluidic substrate comprises:

a plurality of first straight driving electrodes arranged in the first direction and located in the first straight region;

a plurality of second straight driving electrodes arranged in the second direction and located in the second straight region; and a plurality of turning driving electrodes located in the first turning region; a border of each turning driving electrode including at least one first reference point coinciding with the first arc edge and at least one second reference point coinciding with the second arc edge, wherein a radius of the first arc edge is greater than or equal to $(\sqrt{3}-1)$ times of a first dimension of a reference electrode, and a radius of the second arc edge is greater than or equal to /3;2 times of the first dimension of the reference electrode; the reference electrode is one of the plurality of first straight driving electrodes and the plurality of second straight driving electrodes, and the first dimension of the reference electrode is a dimension of an edge, perpendicular to a transport direction, of the reference electrode.

2. The microfluidic substrate according to claim 1, wherein the turning driving electrode is substantially of a ring sector, an isosceles trapezoid, a triangle or a quasi-triangle; and the plurality of turning driving electrodes are arranged sequentially in the transport direction.

3. The microfluidic substrate according to claim 2, wherein the turning driving electrode is substantially of the ring sector; the turning driving electrode includes a third arc edge and a fourth arc edge that are opposite, and the third arc edge is closer to the inner side of the first turning region than the fourth arc edge; the at least one first reference point is at least one point of the third arc edge that coincides with the first arc edge; and the at least one second reference point is at least one point of the fourth arc edge that coincides with the second arc edge; or the turning driving electrode is substantially of the ring sector; the turning driving electrode includes a third arc edge and a fourth arc edge that are opposite, and the third arc edge is closer to the inner side of the first turning region than the fourth arc edge; the at least one first reference point is at least one point of the third arc edge that coincides with the first arc edge; the at least one second reference point is at least one point of the fourth arc edge that coincides with the second arc edge; the third arc edge coincides with the first arc edge, and/or the fourth arc edge coincides with the second arc edge; or the turning driving electrode is substantially of the ring sector; the turning driving electrode includes a third arc edge and a fourth arc edge that are opposite, and the third arc edge is closer to the inner side of the first turning region than the fourth arc edge; the at least one first reference point is at least one point of the third arc edge that coincides with the first arc edge; the at least one second reference point is at least one point of the fourth arc edge that coincides with the second arc edge; and a length of a side edge, perpendicular to the transport direction, of the turning driving electrode is approximately equal to the first dimension of the reference electrode.

4. The microfluidic substrate according to claim 2, wherein the turning driving electrode is substantially of the isosceles trapezoid; a first reference point is a midpoint of a short base of the turning driving electrode that coincides with the first arc edge; and a second reference point is a midpoint of a long base of the turning driving electrode that coincides with the second arc edge; or the turning driving electrode is substantially of the isosceles trapezoid; a first reference point is a midpoint of a short base of the turning driving electrode that coincides with the first arc edge; a second reference point is a midpoint of a long base of the turning driving electrode that coincides with the second arc edge; and a length of a height of the turning driving electrode is approximately equal to the first dimension of the reference electrode.

5. The microfluidic substrate according to claim 3, wherein the plurality of turning driving electrodes are approximately same in shape, and approximately equal in area; and/or at least one turning driving electrode includes at least two turning sub-electrodes, and sizes of all turning sub-electrodes are approximately equal.

6. The microfluidic substrate according to claim 3, wherein the first turning region is provided with three turning driving electrodes therein; the radius of the first arc edge of the first turning region is greater than the first dimension of the reference electrode, and the radius of the second arc edge of the first turning region is greater than 2 times of the first dimension of the reference electrode; or the first turning region is provided with five turning driving electrodes therein; the radius of the second arc edge of the first turning region is greater than or equal to 4 times of the first dimension of the reference electrode.

7. The microfluidic substrate according to claim 2, wherein the turning driving electrode is substantially of the quasi-triangle, and at least one edge of the quasi-triangle is an arc edge;

at least one turning driving electrode has an arc edge coinciding with the first arc edge, and another at least one turning driving electrode has an arc edge coinciding with the second arc edge;

an edge, proximate to a first straight driving electrode, of a turning driving electrode adjacent to the first straight driving electrode is a straight edge; and an edge, proximate to a second straight driving electrode, of a turning driving electrode adjacent to the second straight driving electrode is a straight edge; and the plurality of turning driving electrodes are spliced into a ring sector in the transport direction.

8. The microfluidic substrate according to claim 7, wherein the plurality of turning driving electrodes include a first turning electrode, a second turning electrode and a third turning electrode that are arranged sequentially in the transport direction;

a shape of the first turning electrode is same as a shape of the third turning electrode;

a vertex of the first turning electrode and a vertex of the third turning electrode are as first reference points that coincide with the first arc edge; and an arc edge of the first turning electrode and an arc edge of the third turning electrode both coincide with the second arc edge;

a vertex of the second turning electrode is as a second reference point that coincides with the second arc edge, and an arc edge of the second turning electrode coincides with the first arc edge; and shapes of an edge of the first turning electrode and an edge of the second turning electrode that are proximate to each other match, and shapes of an edge of the third turning electrode and an edge of the second turning electrode that are proximate to each other match.

9. The microfluidic substrate according to claim 8, further having a third straight region, a fourth straight region, a second turning region, a third turning region and a fourth turning region, wherein the third straight region extends in the first direction, and the third straight region and the first straight region are arranged on both sides of a region surrounded by the first turning region, the second turning region, the third turning region and the fourth turning region in the first direction; the fourth straight region extends in the second direction, and the fourth straight region and the second straight region are arranged on both sides of the region surrounded by the first turning region, the second turning region, the third turning region and the fourth turning region in the second direction;

both ends of the second turning region are respectively connected to the second straight region and the third straight region, both ends of the third turning region are respectively connected to the third straight region and the fourth straight region, and both ends of the fourth turning region are respectively connected to the fourth straight region and the first straight region;

a portion of the first turning region connected to the second straight region coincides with a portion of the second turning region connected to the second straight region; a portion of the second turning region connected to the third straight region coincides with a portion of the third turning region connected to the third straight region; a portion of the third turning region connected to the fourth straight region coincides with a portion of the fourth turning region connected to the fourth straight region; and a portion of the fourth turning region connected to the first straight region coincides with a portion of the first turning region connected to the first straight region;

the microfluidic substrate further comprises:

a plurality of third straight driving electrodes arranged in the first direction and located in the third straight region;

a plurality of fourth straight driving electrodes arranged in the second direction and located in the fourth straight region; shapes of the third straight driving electrodes and the fourth straight driving electrodes being both substantially rectangles; and a fourth turning electrode, a fifth turning electrode, a sixth turning electrode, a seventh turning electrode and an eighth turning electrode; the first turning electrode and the fifth turning electrode having a same shape and being symmetrically arranged; the second turning electrode and the sixth turning electrode having a same shape and being symmetrically arranged; the third turning electrode and the seventh turning electrode having a same shape and being symmetrically arranged; and the fourth turning electrode and the eighth turning electrode having a same shape and being symmetrically arranged, wherein the third turning electrode, the fourth turning electrode and the fifth turning electrode are located in the second turning region; the fifth turning electrode, the sixth turning electrode and the seventh turning electrode are located in the third turning region; and the seventh turning electrode, the eighth turning electrode and the first turning electrode are located in the fourth turning region.

10. The microfluidic substrate according to claim 2, wherein an included angle between the first direction and the second direction is a right angle or an obtuse angle;

the plurality of turning driving electrodes include:

a central electrode in a shape of an isosceles triangle; two legs of the central electrode being respectively perpendicular to the first direction and the second direction;

a first sub-electrode in a shape of a right triangle; a long right-angle edge of the first sub-electrode being adjacent to a first straight driving electrode, and the long right-angle edge of the first sub-electrode being substantially perpendicular to the first direction;

a second sub-electrode in a shape of a right triangle; a long right-angle edge of the second sub-electrode being adjacent to a second straight driving electrode, and the long right-angle edge of the second sub-electrode being substantially perpendicular to the second direction;

a third sub-electrode in a shape of an isosceles triangle; the third sub-electrode being disposed between the first sub-electrode and the central electrode, and two legs of the third sub-electrode being substantially parallel to a hypotenuse of the first sub-electrode and a leg of the central electrode, respectively; and a fourth sub-electrode in a shape of an isosceles triangle; the fourth sub-electrode being disposed between the second sub-electrode and the central electrode, and two legs of the fourth sub-electrode being substantially parallel to a hypotenuse of the second sub-electrode and another leg of the central electrode, respectively.

11. The microfluidic substrate according to claim 10, wherein the included angle between the first direction and the second direction is approximately 120°; and the central electrode is in a shape of an equilateral triangle; or lengths of legs of the central electrode are each less than or equal to $\sqrt{2}$ times of the first dimension of the reference electrode; a length of the long right-angle edge of the first sub-electrode and a length of the long right-angle edge of the second sub-electrode are both approximately equal to the first dimension of the reference electrode, and a length of the hypotenuse of the first sub-electrode and a length of the hypotenuse of the second sub-electrode are approximately equal to the lengths of the legs of the central electrode; and a length of a leg of the third sub-electrode and a length of a leg of the fourth sub-electrode are approximately equal to the lengths of the legs of the central electrode, and a length of a base of the third sub-electrode and a length of a base of the fourth sub-electrode are approximately equal to a length of a short right-angle edge of the first sub-electrode and a length of a short right-angle edge of the second sub-electrode, respectively; or lengths of legs of the central electrode is $$\frac{\sqrt{5}}{2}$$

times of the first dimension of the reference electrode, and a length of a short right-angle edge of the first sub-electrode and a length of a short right-angle edge of the second sub-electrode are each ½ times of a second dimension of the reference electrode; the second dimension of the reference electrode is a dimension of an edge, in the transport direction, of the reference electrode.

12. The microfluidic substrate according to claim 10, wherein a vertex of the first sub-electrode opposite to a short right-angle edge thereof, a midpoint of a base of the third sub-electrode, a vertex of the central electrode opposite to a base thereof, a midpoint of a base of the fourth sub-electrode and a vertex of the second sub-electrode opposite to a short right-angle edge thereof are each as a respective first reference point that coincides with the first arc edge of the first turning region;

a midpoint of the short right-angle edge of the first sub-electrode, a vertex of the third sub-electrode opposite to the base thereof, a midpoint of the base of the central electrode, a vertex of the fourth sub-electrode opposite to the base thereof and a midpoint of the short right-angle edge of the second sub-electrode are each as a respective second reference point that coincides with the second arc edge of the first turning region.

13. The microfluidic substrate according to claim 10, further having a turning extension region and a fifth straight region extending in a third direction; both ends of the turning extension region being respectively connected to the first turning region and the fifth straight region;

the microfluidic substrate further comprising:

a plurality of fifth straight driving electrodes arranged in the third direction and located in the fifth straight region; the first direction, the second direction and the third direction intersecting one another, and the third direction being perpendicular to a base of the central electrode;

a fifth sub-electrode in a shape of a right-angle triangle and located in the turning extension region; a long right-angle edge of the fifth sub-electrode being adjacent to a fifth straight driving electrode, and the long right-angle edge of the fifth sub-electrode being substantially perpendicular to the third direction; and a sixth sub-electrode in a shape of an isosceles triangle and located in the turning extension region; the sixth sub-electrode being disposed between the fifth sub-electrode and the central electrode, and two legs of the sixth sub-electrode being respectively parallel to a hypotenuse of the fifth sub-electrode and the base of the central electrode.

14. The microfluidic substrate according to claim 13, wherein a length of the long right-angle edge of the fifth sub-electrode is approximately equal to a length of an edge, adjacent to the long right-angle edge of the fifth sub-electrode, of the fifth straight driving electrode, and a length of the hypotenuse of the fifth sub-electrode is approximately equal to a length of the base of the central electrode;

lengths of the legs of the sixth sub-electrode are approximately equal to the length of the base of the central electrode, and a length of a base of the sixth sub-electrode is approximately equal to a length of a short right-angle edge of the fifth sub-electrode.

15. The microfluidic substrate according to claim 1, wherein the first straight driving electrodes and the second straight driving electrodes are approximately same in shape, and approximately equal in area; and/or shapes of the first straight driving electrodes and the second straight driving electrodes are both substantially rectangles.

16. The microfluidic substrate according to claim 1, wherein a ratio of a first dimension of a first straight driving electrode to a second dimension of the first straight driving electrode is 1 to 4; the first dimension of the first straight driving electrode is a dimension of an edge, perpendicular to the transport direction, of the first straight driving electrode, and the second dimension of the first straight driving electrode is a dimension of an edge, in the transport direction, of the first straight driving electrode; and/or a ratio of a first dimension of a second straight driving electrode to a second dimension of the second straight driving electrode is 1 to 4; the first dimension of the second straight driving electrode is a dimension of an edge, perpendicular to the transport direction, of the second straight driving electrode, and the second dimension of the second straight driving electrode is a dimension of an edge, in the transport direction, of the second straight driving electrode; and/or in the transport direction, a maximum distance between two adjacent first straight driving electrodes is less than or equal to 10 μm, and/or a maximum distance between two adjacent second straight driving electrodes is less than or equal to 10 μm, and/or a maximum distance between two adjacent turning driving electrodes is less than or equal to 10 μm; and/or two adjacent side edges, perpendicular to the transport direction, in at least one pair of electrodes are each in a shape of a zigzag and are engaged, the at least one pair of electrodes are from two adjacent first straight driving electrodes, two adjacent second straight driving electrodes, two adjacent turning driving electrodes, a first straight driving electrode and a turning driving electrode that are adjacent to each other, and a second straight driving electrode and a turning driving electrode that are adjacent to each other.

17. The microfluidic substrate according to claim 1, wherein the reference electrode is a first straight driving electrode adjacent to a turning driving electrode or a second straight driving electrode adjacent to another turning driving electrode; and/or the reference electrode is a first straight driving electrode adjacent to a turning driving electrode or a second straight driving electrode adjacent to another turning driving electrode; in the turning driving electrode and the first straight driving electrode that are adjacent, lengths of two side edges that are proximate to each other are equal; and in the another turning driving electrode and the second straight driving electrode that are adjacent, lengths of two side edges that are proximate to each other are equal.

18. The microfluidic substrate according to claim 1, further comprising:

a first substrate; and a first conductive layer, an insulating layer, a second conductive layer and a first hydrophobic layer that are disposed on the first substrate sequentially, wherein the first straight driving electrodes, the second straight driving electrodes and the turning driving electrodes are disposed in one of the first conductive layer and the second conductive layer; and another of the first conductive layer and the second conductive layer includes a plurality of signal lines, and the plurality of signal lines are electrically connected to the first straight driving electrodes, the second straight driving electrodes and the turning driving electrodes through via holes disposed in the insulating layer.

19. A microfluidic chip, comprising:

the microfluidic substrate according to claim 1; and a cover plate opposite to and spaced apart from the microfluidic substrate; the cover plate including:

a second substrate; and a common electrode layer and a second hydrophobic layer that are disposed on the second substrate sequentially.

20. A microfluidic system, comprising the microfluidic chip according to claim 19.

* * * * *